United States Patent [19]

Rhein et al.

[11] Patent Number: 5,346,248
[45] Date of Patent: Sep. 13, 1994

[54] AIRBAG ASSEMBLY

[75] Inventors: John F. Rhein, St. Clair; Lynn M. Redmond, New Baltimore; Dennis F. Farquhar, New Baltimore, all of Mich.

[73] Assignee: TRW Vehicle Safety Systems Inc., Lyndhurst, Ohio

[21] Appl. No.: 892,200

[22] Filed: Jun. 2, 1992

[51] Int. Cl.⁵ .............................................. B60K 21/16
[52] U.S. Cl. .................................. 280/728 R; 280/732
[58] Field of Search .......... 280/728 A, 741 R, 743 R, 280/731, 732, 736, 728 B

[56] References Cited

U.S. PATENT DOCUMENTS

| | | |
|---|---|---|
| 3,880,447 | 4/1975 | Thorn et al. |
| 3,938,826 | 2/1976 | Giorgini et al. |
| 4,111,457 | 9/1978 | Kob et al. ............................ 280/728 |
| 4,842,300 | 6/1989 | Ziomek et al. ...................... 280/732 |
| 4,852,907 | 8/1989 | Shiraki et al. ...................... 280/731 |
| 4,913,461 | 4/1990 | Cuevas ................................ 280/731 |
| 4,915,410 | 4/1990 | Bachelder ........................... 280/732 |
| 4,941,678 | 7/1990 | Lauritzen et al. .................. 280/732 |
| 4,986,569 | 1/1991 | Bruton ................................ 280/743 |
| 4,988,119 | 1/1991 | Hartmeyer ......................... 280/743 |
| 5,002,306 | 3/1991 | Hiramitsu et al. ................. 280/731 |
| 5,009,452 | 4/1991 | Miller ................................. 280/731 |
| 5,011,181 | 4/1991 | Laucht et al. ...................... 280/731 |
| 5,058,919 | 10/1991 | Paquette et al. .................. 280/732 |
| 5,064,218 | 11/1991 | Hartmeyer ....................... 280/743 |
| 5,069,480 | 12/1991 | Good ................................ 280/728 |
| 5,121,941 | 6/1992 | Mihm et al. ...................... 280/732 |
| 5,186,492 | 2/1993 | Wright et al. .................... 280/732 |

OTHER PUBLICATIONS

Application Ser. No. 07/657,423, filed Feb. 19, 1991 for "Air Bag Module".

Primary Examiner—Margaret A. Focarino
Assistant Examiner—Paul Dickson
Attorney, Agent, or Firm—Calfee Halter & Griswold

[57] ABSTRACT

An airbag assembly 20 includes an inflator 100, a coupling device 300, an airbag 400, a cover 500 and a reaction device 600. The inflator 100 is positioned to supply inflation fluid to the airbag 400. The coupling device 300, the airbag 400, and the cover 500 are coupled to the reaction device 600 with a minimum number of fastening elements 28. The airbag assembly 20 further comprises a heat shield 200 which cradles a rear portion of the inflator 100 and which is coupled to the reaction device 600. The heat shield 200 is coupled to the reaction device by the fastening elements 28.

50 Claims, 20 Drawing Sheets

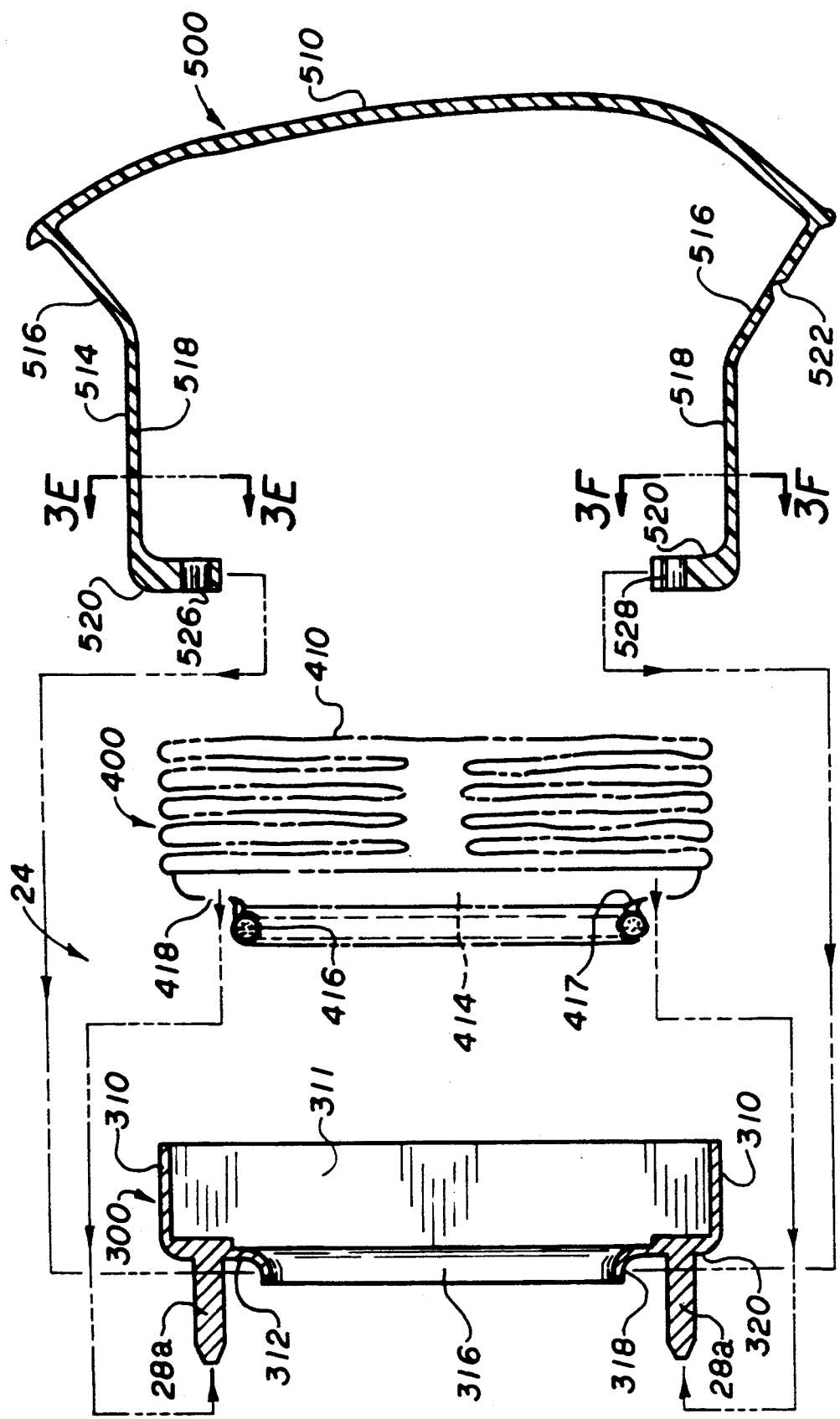

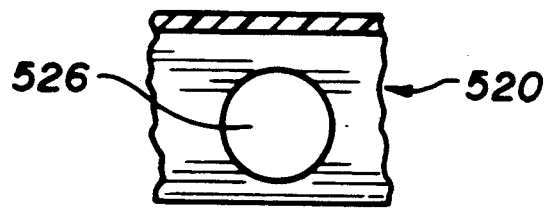
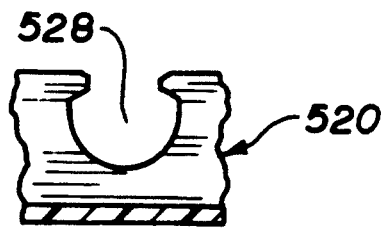
FIG. 3E    FIG. 3F
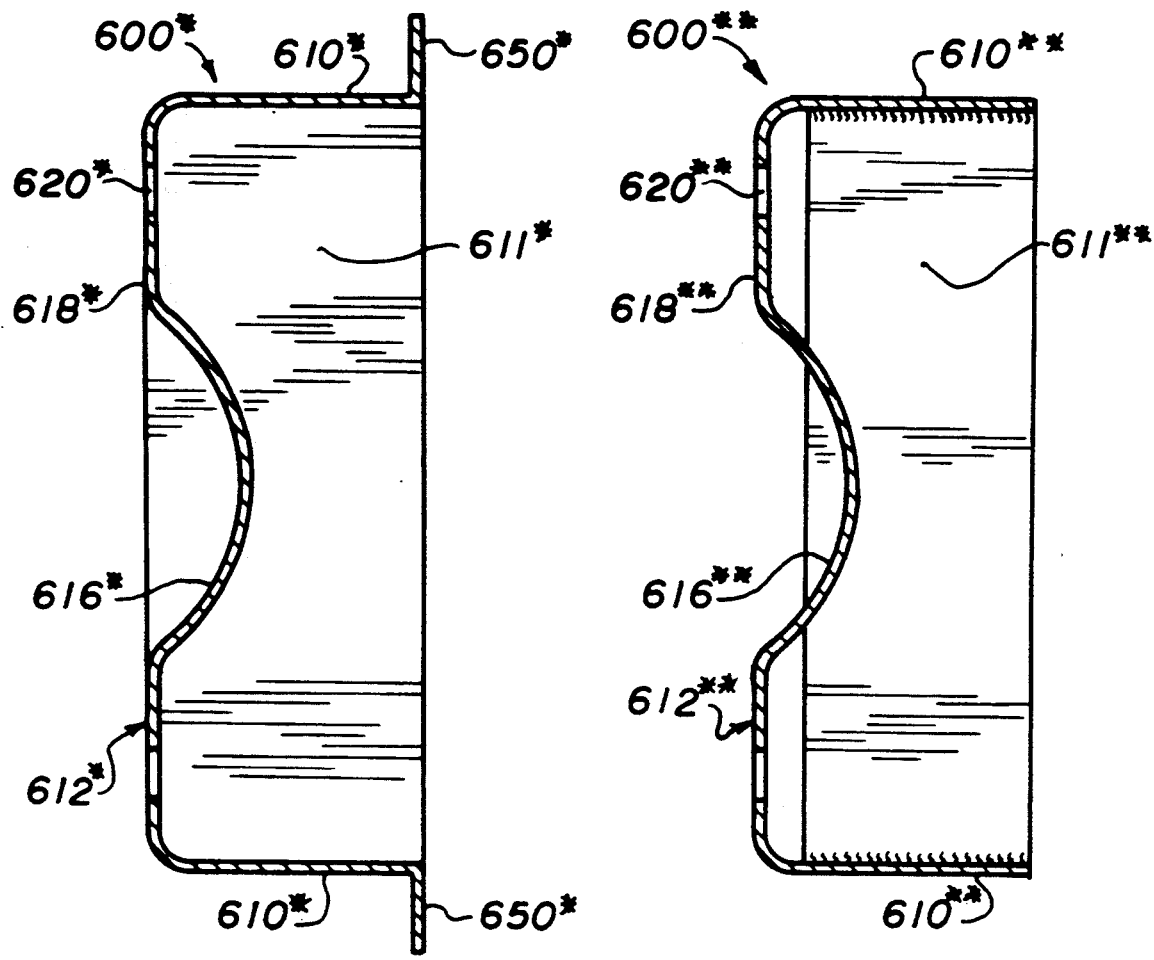
FIG. 7    FIG. 8

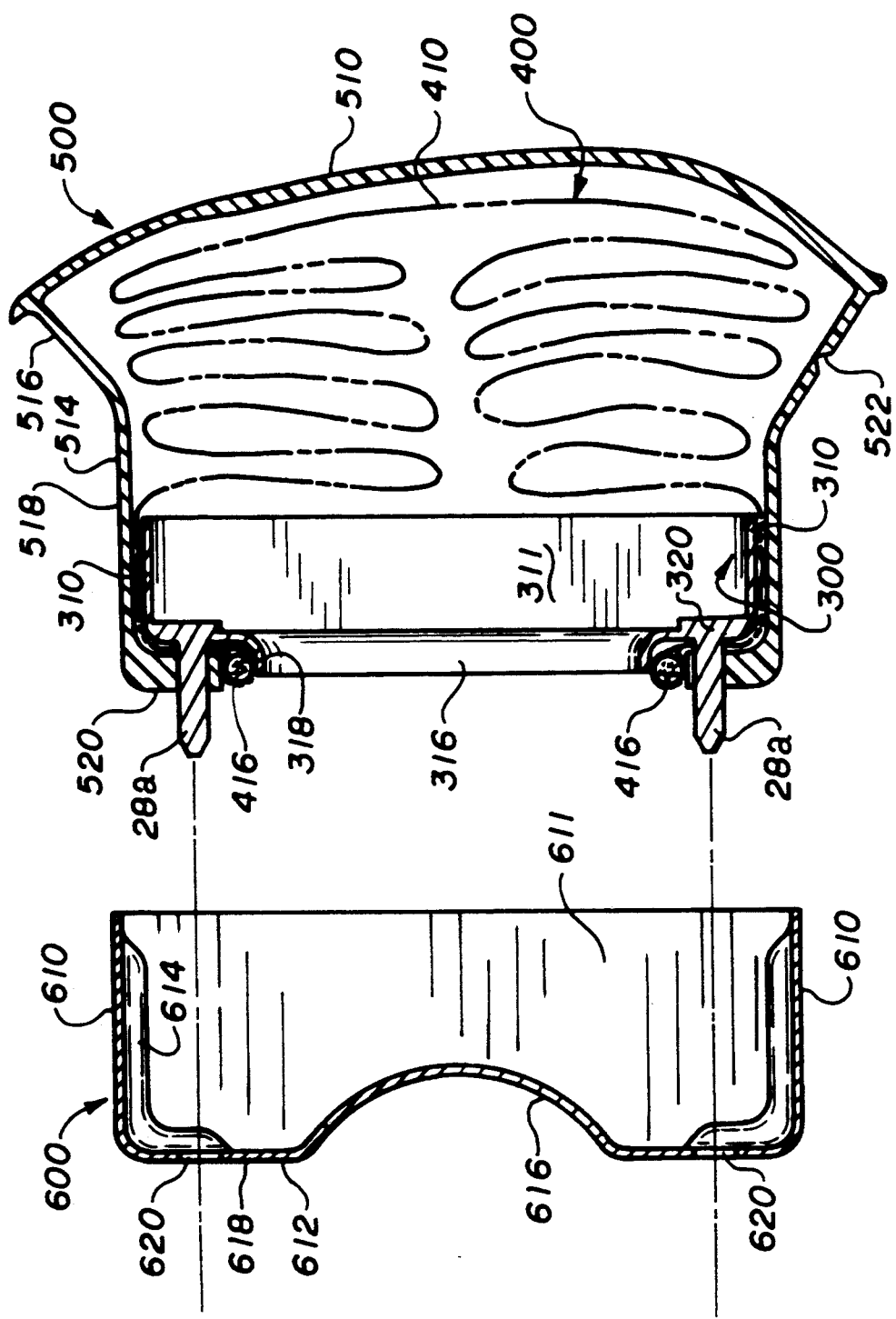

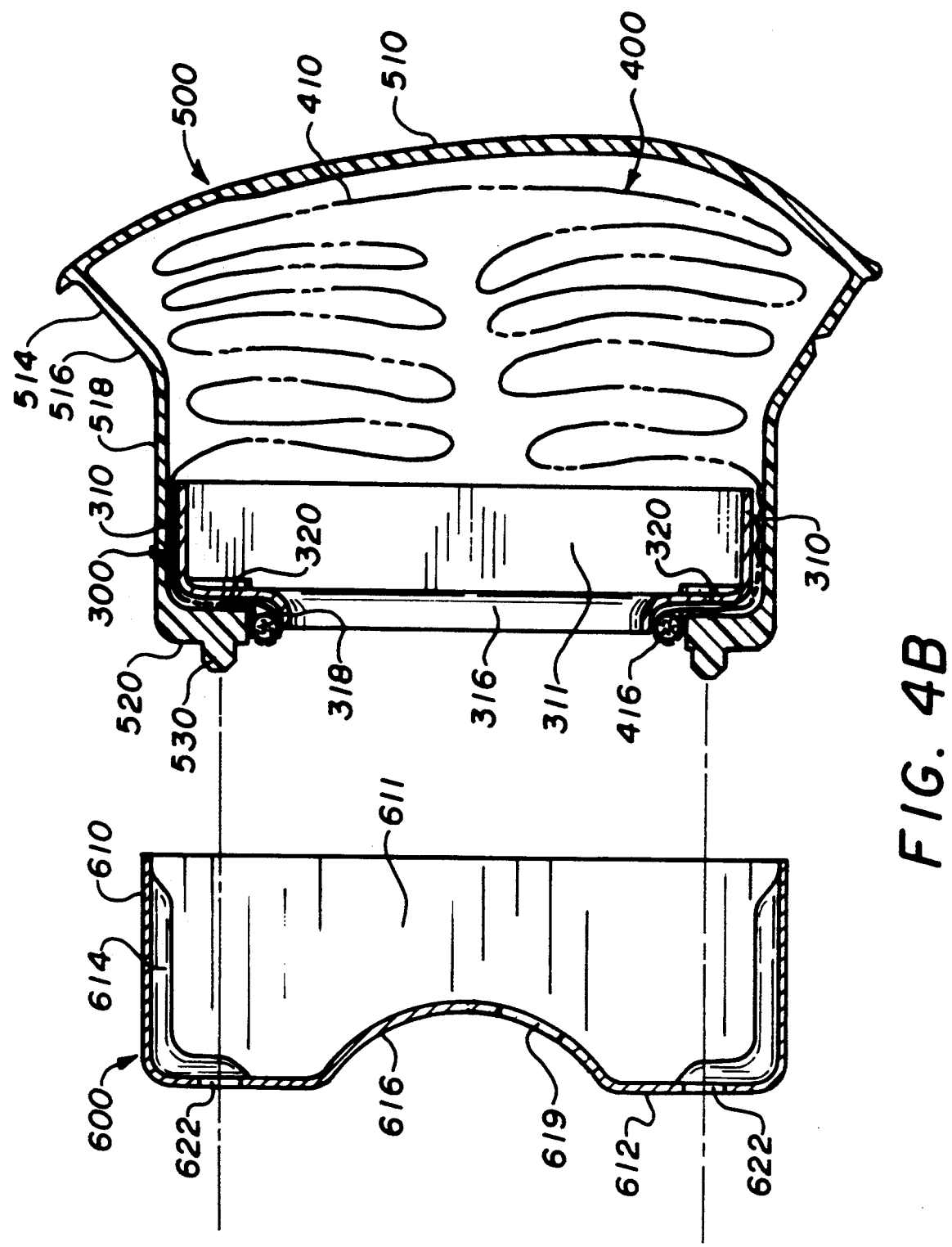

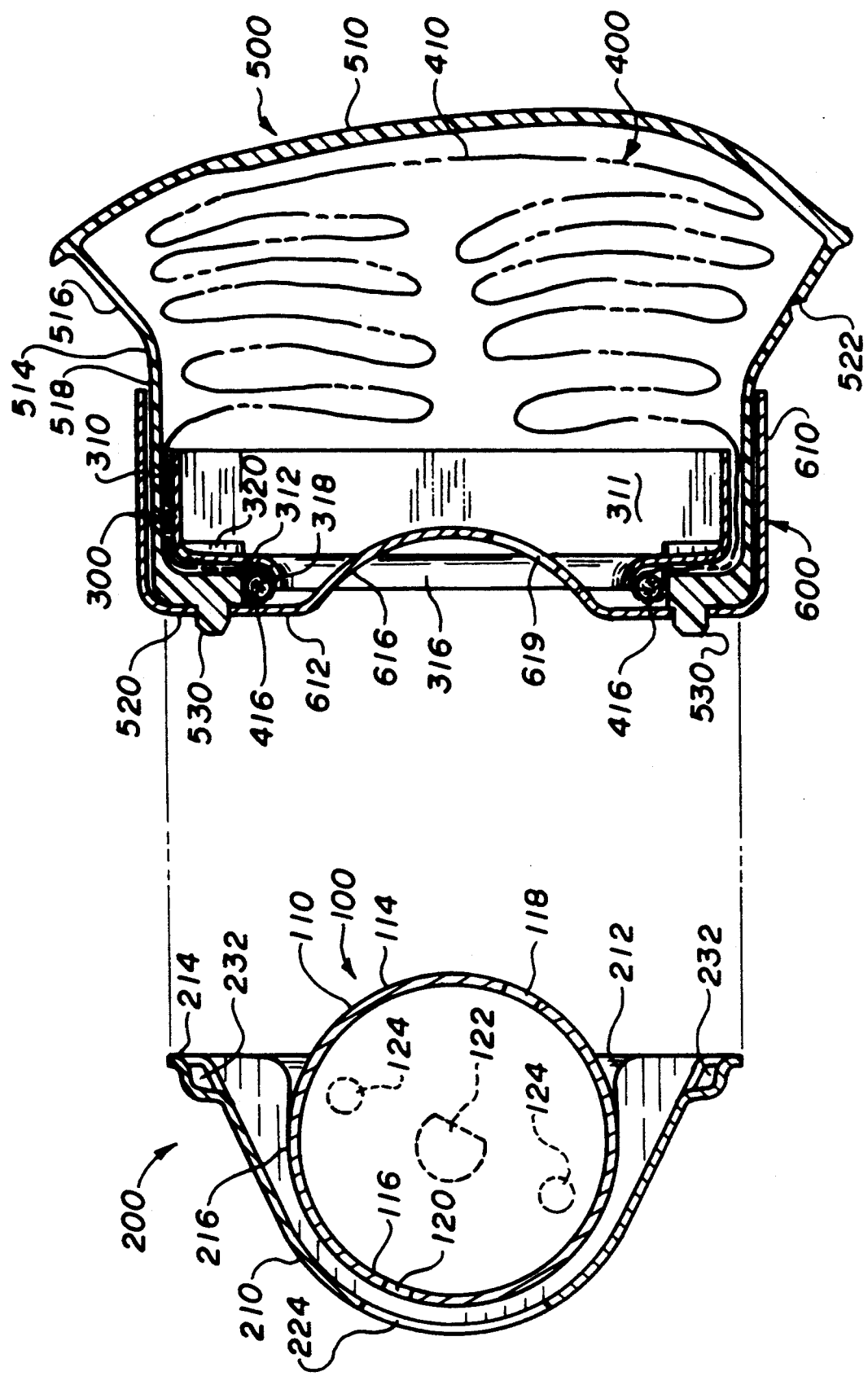

AIRBAG ASSEMBLY

FIELD OF THE INVENTION

This invention relates generally to an airbag assembly and more particularly to an airbag assembly in which a coupling device, an airbag, and a cover are coupled to a reaction device with a minimum number of fastening elements.

BACKGROUND OF THE INVENTION

A vehicle airbag assembly commonly includes an inflator, an airbag, a cover, and a reaction device which cooperate to protect a vehicle occupant in the event of a crash or collision. The airbag assembly is generally mounted to a structural part of a vehicle via the reaction device. In the case of a passenger side airbag assembly, for example, the reaction device may be mounted to the support structure for the vehicle instrument panel. The cover, which separates the remaining components of the airbag assembly from an occupant compartment, is usually designed to form a part of the vehicle instrument panel.

When mounted to a vehicle, an airbag assembly operates to deploy an airbag at the onset of a vehicle collision. Specifically, at the onset of a collision, an inflator supplies inflation fluid to the airbag. This supply of inflation fluid expands the airbag to sequentially (although almost instantaneously) create an opening in the cover, force the airbag through the opening into the occupant compartment, and fully inflate the airbag to cushion an occupant against impact with a structural part of the vehicle. A heat shield may be incorporated into the airbag assembly to protect the vehicle from heat transferred by the inflator during deployment.

In the airbag industry, the development of new and more cost-effective methods for making airbag assemblies is becoming increasingly important. More particularly, airbag assemblies are currently being installed in a large number of automobiles. As consumer demand and federal regulatory requirements for vehicle safety continue to escalate, the number of airbag assemblies installed in the future will continue to increase. To enable auto-makers to meet this growing demand, there is a continuing need for simple and effective techniques which lend themselves to the efficient and economical production of airbag assemblies.

One factor which affects the cost and complication of production is the fabrication of the individual components of an airbag assembly. In many existing airbag assemblies, certain components, such as the reaction device and/or the heat shield, are multi-piece structures formed by bolting, riveting or welding several pieces together. While such multi-piece structures have proven satisfactory, the associated fabrication techniques are sometimes quite complicated and time-consuming. More specifically, in the fabrication of a multi-piece structure, it is necessary to align or position the various components in correct orientations and then bolt, rivet, or weld these aligned components to each other.

Additionally, irrespective of whether a component is a multi-piece structure, coupling holes must usually be formed in the component to receive primary fastening elements of the airbag assembly. The location of these coupling holes (and other features which must be formed by further processing) are often such that they must be formed by multi-directional piercing or punching. Consequently, it is often necessary to align or position the component in a plurality of orientations to perform these further processing steps.

Another factor which affects the cost and complication of production is the incorporation of the inflator into the airbag assembly. The inflator is generally the heaviest component of the airbag assembly and thus an early incorporation of this component is usually undesirable. Moreover, the transportation and/or storage of inflators often involves compliance with certain safety regulations which are inapplicable to the other components of the airbag assembly. Accordingly, many manufacturers prefer to incorporate the inflator into the airbag assembly at a later stage and/or a different location than the other components of the airbag assembly.

Yet another factor which influences production efficiency is the assembly of the individual components of an airbag assembly together. In a typical assembly process, the airbag is coupled to the reaction device with a set of fastening elements (such as bolts or rivets), and the cover is coupled to the reaction device with an additional set of fastening elements. If the airbag assembly includes a heat shield, this component is also coupled to the reaction device with fastening elements.

Generally, the more separate fastening elements incorporated into an airbag assembly, the more complicated the assembly technique. Although some airbag assembly designs have used one set of fastening elements to couple both the airbag and the cover together, such designs require twenty or more separate fastening elements per airbag assembly. (See e.g., U.S. Pat. No. 5,121,941. Additionally, in many airbag assemblies, the only option for fastening elements is blind rivets which prevent visual inspection of the locking portions of the fastening elements.

For these reasons, applicants believe a need remains for an airbag assembly which (i) avoids the complicated fabrication techniques associated with multi-piece structures and/or multi-directional piercing; (ii) allows the incorporation of the inflator into the airbag assembly at a later time and/or a different location than the other components of the airbag assembly; and (iii) minimizes the number of fastening elements and eliminates the need for blind rivets.

SUMMARY OF THE INVENTION

The present invention provides an airbag assembly in which certain components may be efficiently and economically formed by stamping and further processed by unidirectional forming and piercing. Consequently, the complicated fabrication techniques associated with multi-piece structures and/or multi-directional piercing are avoided. Additionally, the associated assembly methods allow the incorporation of the inflator into the airbag assembly at a later time and/or a different location than the other components of the airbag assembly. Still further, the fastening elements of the airbag assembly preferably consist of six fastening elements in which the locking portions are visible from the exterior of the airbag assembly. Accordingly, the number of fastening elements is minimized and the need for blind rivets is eliminated.

More particularly, the present invention provides an airbag assembly comprising an inflator, a coupling device, an airbag, a cover and a reaction device. The inflator is positioned to supply inflation fluid to the airbag. The coupling device, the airbag, and the cover are coupled to the reaction device with a set of fastening elements consisting essentially of six or less fastening elements. The airbag assembly further comprises a heat shield which cradles a rear portion of the inflator and which is coupled to the reaction device. In one embodiment of the invention, the heat shield is coupled to the reaction device by the fastening elements. In an alternate embodiment of the invention, the heat shield is formed in one piece with the reaction device.

Each of the fastening elements comprises a shaft portion and a locking portion which mates with the shaft portion to lock the fastening element in a desired position. In the completed airbag assembly, the locking portions are visible from the exterior of the airbag assembly. The shaft portions are preferably integrally joined with the coupling device to simplify assembly techniques further.

The reaction device includes a rear wall including an inflator-accommodating portion, which receives a front portion of the inflator, and a coupling surface, which surrounds the inflator-accommodating portion. The coupling device also includes an inflator-accommodating portion which receives the front portion of the inflator and a coupling surface which surrounds the inflator-accommodating portion. The fastening elements are joined to the coupling surface of the coupling device and extend through the coupling surface of the reaction device. The coupling surfaces of the reaction device and the coupling device are each planar and the coupling surfaces are disposed parallel to each other. In one embodiment of the invention, the heat shield includes a planar coupling surface which is disposed parallel to the coupling surfaces of the coupling device and the reaction device. The fastening elements extend through the coupling surface of the heat shield thereby coupling it to the reaction device.

The present invention also provides a method of assembling an airbag assembly comprising the step of providing an inflator, a heat shield, a coupling device, an airbag, a cover, and a reaction device. The inflator is coupled to the heat shield to form an inflator/shield subassembly. The coupling device, the airbag, and the cover are coupled together to form an airbag/cover subassembly and the airbag/cover subassembly is coupled to the reaction device to form a reaction/airbag/cover subassembly. The inflator/shield subassembly is then coupled to the reaction/airbag/cover subassembly to complete the airbag assembly. The step of coupling the inflator/shield subassembly to the reaction/airbag/cover subassembly may be performed at a different location than the step of forming the airbag/cover subassembly.

The method preferably further comprises the step of providing set of primary fastening elements which are used to accomplish the coupling steps. More particularly, the primary fastening elements are used to couple the coupling device, the airbag, and the cover together to form the airbag/cover subassembly; couple the reaction device to the airbag/cover subassembly to form the reaction/airbag/cover subassembly; and couple the inflator/shield subassembly to the reaction/airbag/cover subassembly to complete the airbag assembly.

In the reaction/airbag/cover subassembly formed in this method, the coupling device, the airbag, and the cover are coupled to the reaction device with a set of fastening elements. Each of the fastening elements extends through the airbag, the cover and the reaction device. Portions of the cover are sandwiched between the reaction device and the coupling device.

Another method of assembling an airbag assembly according to the present invention comprises the step of providing an inflator, a heat shield, a coupling device, an airbag, a cover, and a reaction device. The heat shield and the reaction device are coupled together to form a combined heat shield/reaction device, and the inflator is coupled to the combined heat shield/reaction device to form a reaction/inflator/shield subassembly. The coupling device, the airbag, and the cover are then coupled together to form an airbag/cover subassembly. The reaction/inflator/shield subassembly and the airbag/cover subassembly are then coupled together to complete the airbag assembly.

These and other features of the invention are fully described and particularly pointed out in the claims. The following descriptive annexed drawings set forth in detail certain illustrative embodiments, however these embodiments are indicative of but a few of the various ways in which the principles of the invention may be employed.

BRIEF DESCRIPTION OF THE DRAWINGS

In the annexed drawings:

FIG. 3C is a sectional view as seen along line 3C—3C in FIGS. 3A and 3B;

FIG. 3E is a sectional view as seen along line 3E—3E in FIG. 3C;

FIG. 3F is a sectional view as seen along line 3F—3F in FIG. 3C;

FIG. 4A is a sectional view as seen along line 4A—4A in FIG. 4;

FIG. 4B is a sectional view as seen along line 4B—4B in FIG. 4;

FIG. 5B is a sectional view as seen along line 5B—5B in FIG. 5;

FIG. 7 is a sectional view of a modified form of a reaction device;

FIG. 8 is a sectional view of another modified form of a reaction device; and

DETAILED DESCRIPTION

Figure 1:
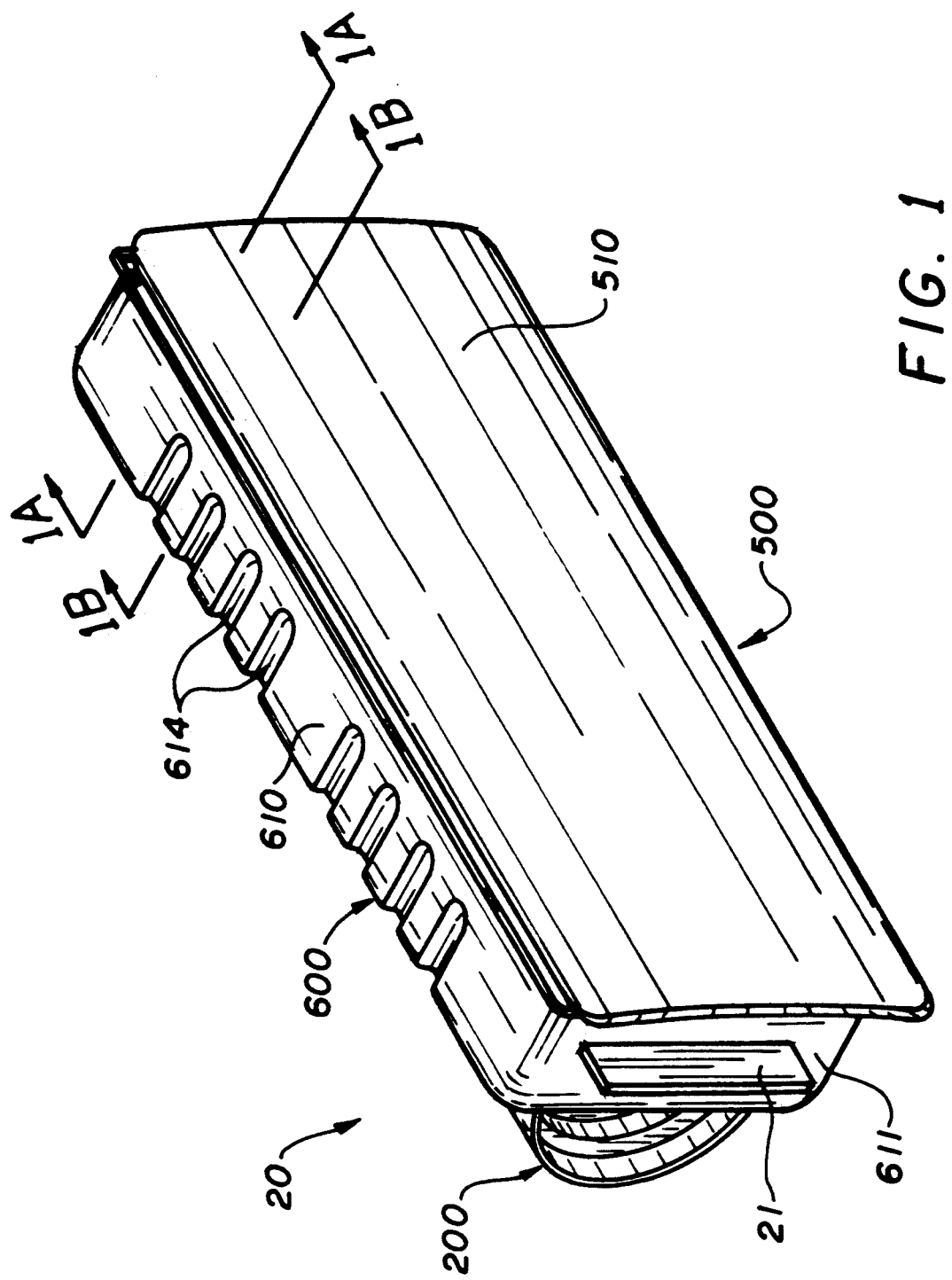
FIG. 1 is a perspective view of an airbag assembly according to the present invention.
Figure 1A:
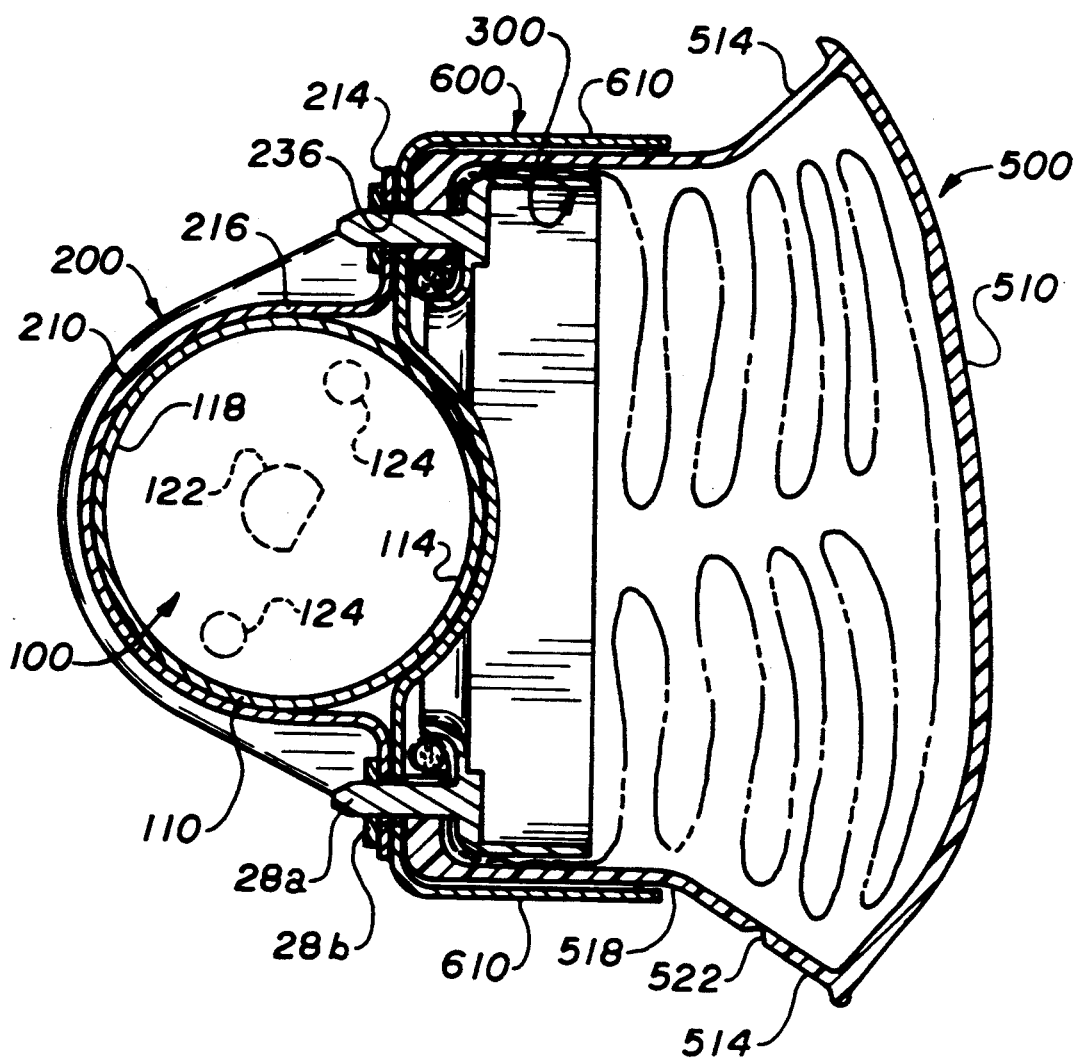
FIG. 1A is a sectional view of the completed airbag assembly as seen along line 1A—1A in FIG. 1.
Figure 1B:
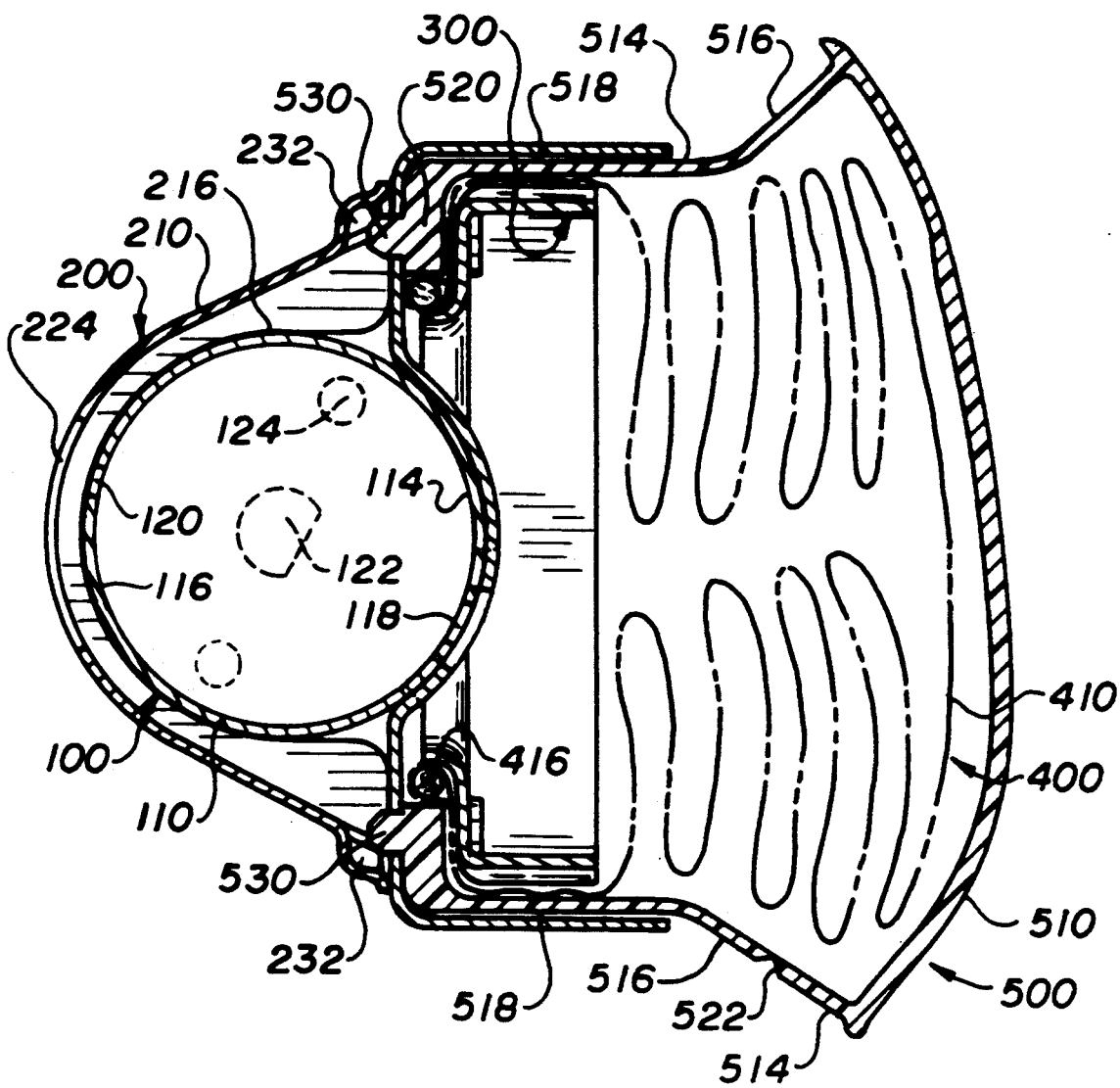
FIG. 1B is a sectional view of the completed airbag assembly as seen along line 1B—1B in FIG. 1.

Referring now to the drawings in detail, an airbag assembly 20 according to the present invention is shown in FIGS. 1, 1A, and 1B. The airbag assembly 20 includes an inflator 100, a heat shield 200, a coupling device 300, an airbag 400, a cover 500, and a reaction device 600. The illustrated airbag assembly 20 is adapted for use on the passenger side of a vehicle. To this end, the reaction device 600 is designed to be mounted, via mounting brackets 21, to the support structure for the vehicle instrument panel. The cover 500, which separates the remaining components of the airbag assembly from the occupant compartment, is designed to form a part of the vehicle instrument panel.

When mounted to a vehicle, the airbag assembly 20 operates to deploy the airbag 400 at the onset of a vehicle collision. Specifically, at the onset of a collision, the inflator 100 supplies inflation fluid to the airbag 400. This supply of inflation fluid expands the airbag 400 to sequentially (although almost instantaneously) create an opening in the cover 500, force the airbag through the opening into the occupant compartment, and fully inflate the airbag to cushion an occupant against impact with a structural part of the vehicle. The heat shield 200 is incorporated into the airbag assembly 20 to protect the vehicle from heat transferred by the inflator 100 during deployment of the airbag 400.

The airbag assembly 20 is designed so that certain components may be efficiently and economically manufactured. More particularly, the heat shield 200, the coupling device 300, and the reaction device 600 are preferably monolithic structures formed by stamping and further processed by unidirectional piercing. ("Monolithic" in this context refers to a structure composed of material without joints or seams.) As such, the complicated assembly steps commonly associated with multi-piece structures, in which a plurality of pieces must be welded, bolted and/or riveted together, are avoided. Additionally, multi-directional piecing steps need not be performed during the fabrication of these components.

Figure 2:
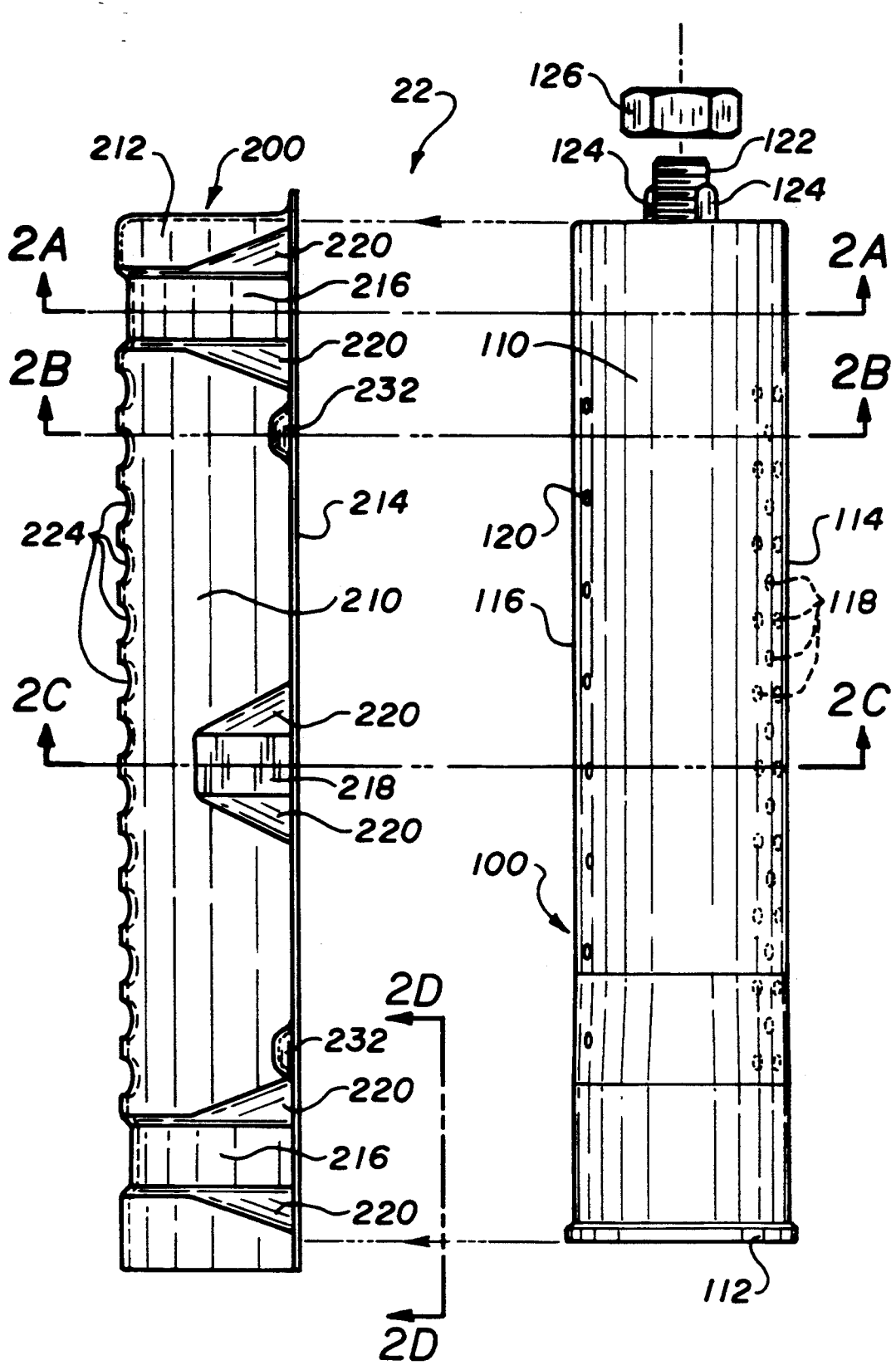
FIG. 2 is a top exploded view of an inflator/shield subassembly formed by coupling an inflator to a heat shield.

To assemble the airbag assembly 20, the inflator 100 is coupled to the heat shield 200 to form an inflator/shield assembly 22. (See FIG. 2.) In a separate assembly step, the coupling device 300, the airbag 400, and the cover 500 are coupled together to form an airbag/cover subassembly 24. (See FIGS. 3A-3B.) The airbag/cover subassembly 24 is then coupled to the reaction device 600 to form a reaction/airbag/cover subassembly 26. (See FIG. 4.) Thereafter, the inflator/shield subassembly 22 is coupled to the reaction/airbag/cover subassembly 26 to complete the airbag assembly 20. (See FIG. 5.) Thus, the incorporation of the inflator/shield subassembly 22 (and therefore the inflator 100) into the airbag assembly 20 may or may not be delayed depending on manufacturing needs.

Figure 4:
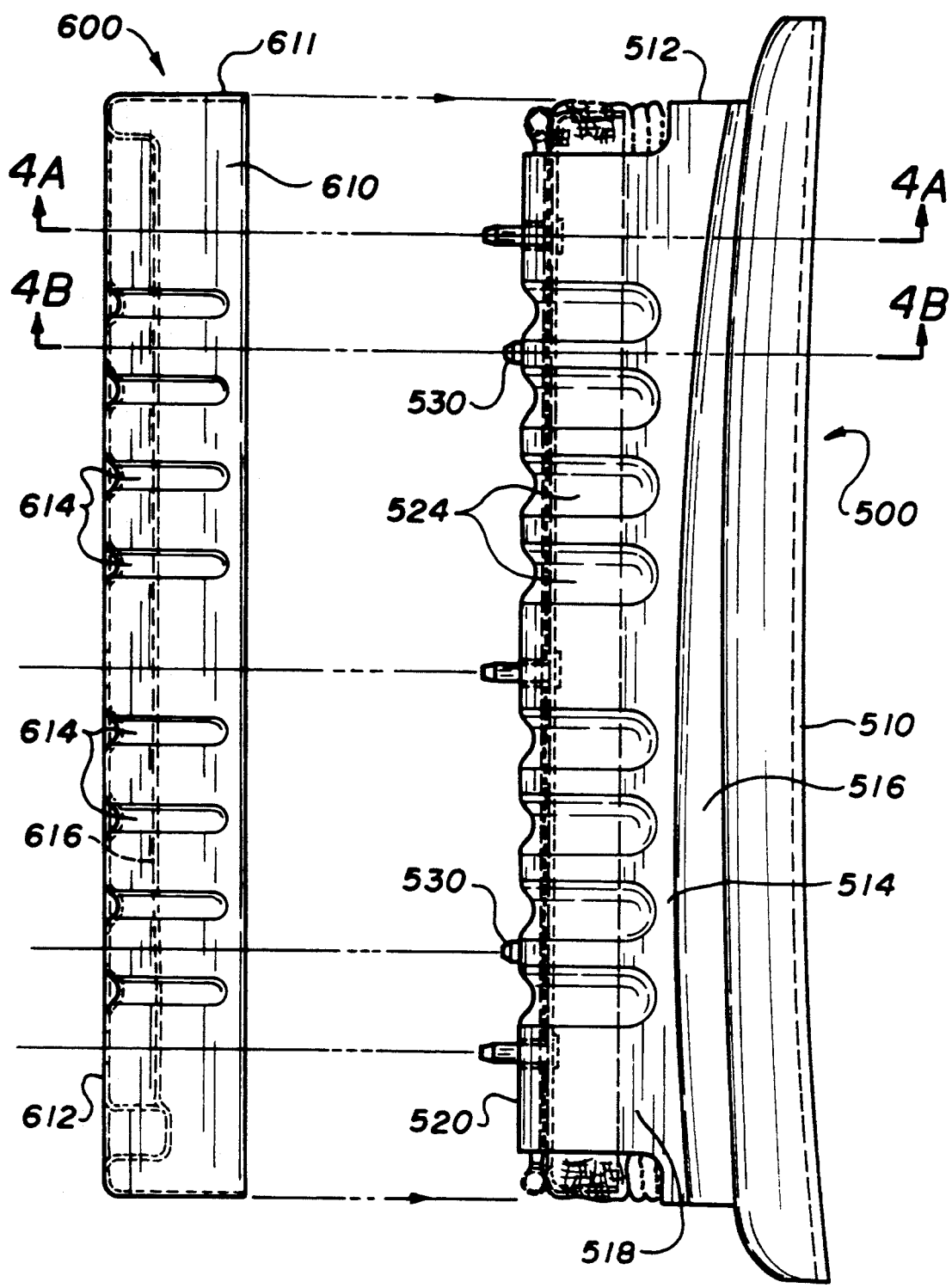
FIG. 4 is an exploded view of a reaction/airbag/cover subassembly formed by coupling the cover/airbag subassembly to a reaction device.
Figure 5:
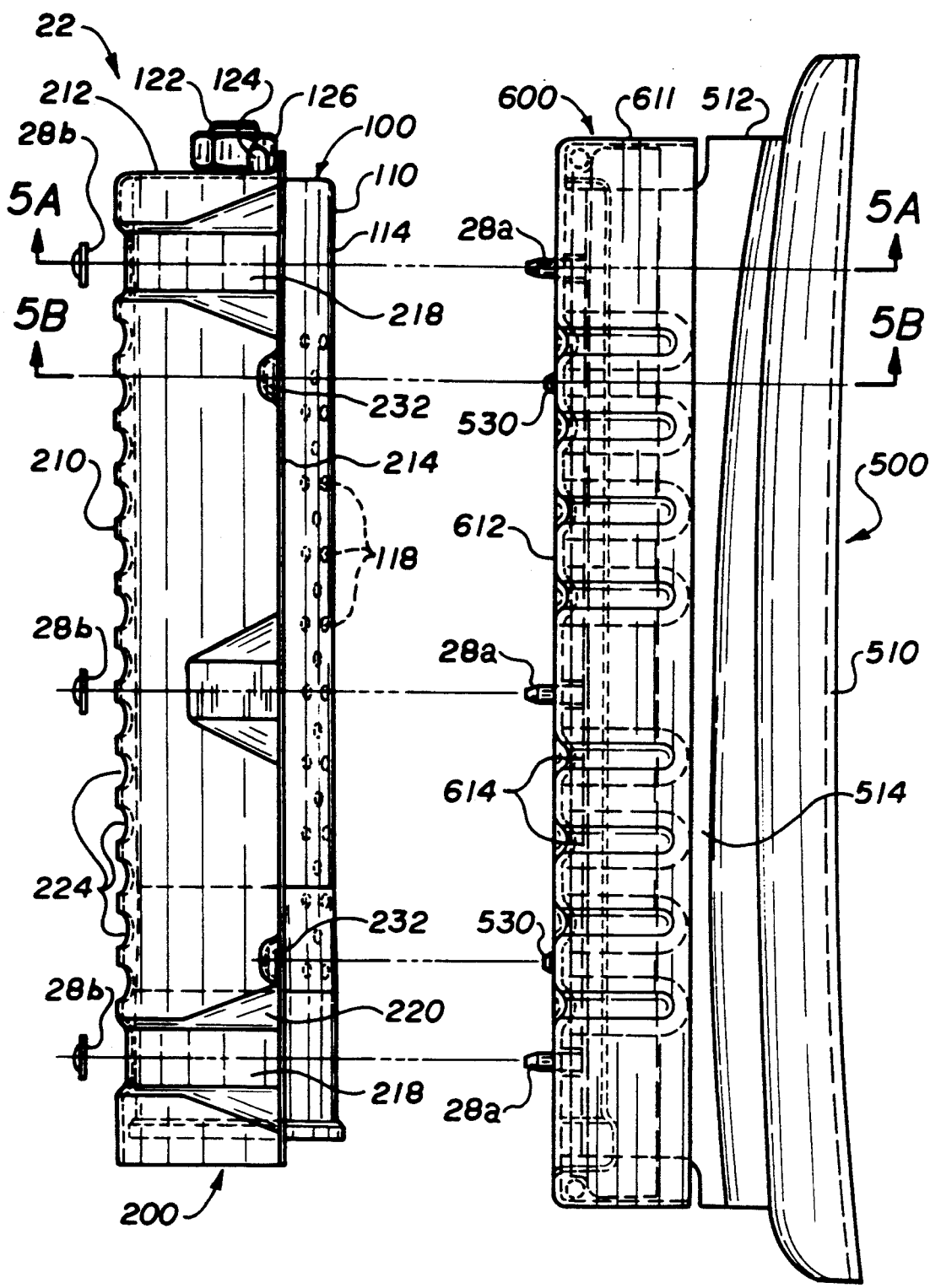
FIG. 5 is an exploded view of the airbag assembly showing the airbag/cover/reaction device subassembly and the inflator/shield subassembly.
Figure 5A:
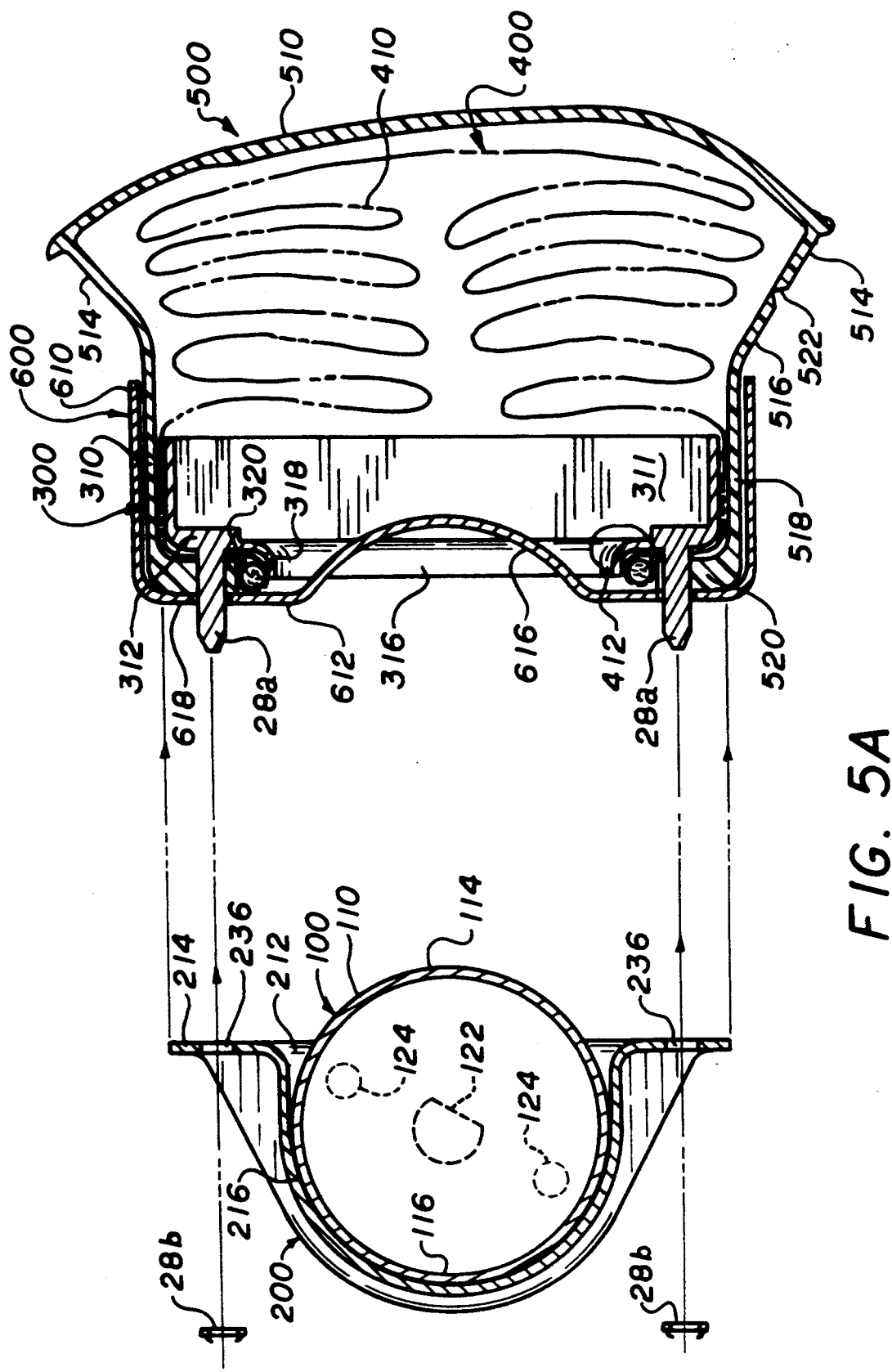
FIG. 5A is a sectional view as seen along line 5A—5A in FIG. 5.

The components of the airbag assembly 20 are also designed so that the number of fastening elements is minimized. More particularly, in the preferred embodiments, the fastening elements consist essentially of six primary fastening elements 28. Each fastening element 28 comprises a shaft portion 28a, which is preferably integrally joined with the coupling device 300, and a locking portion 28b, which mates with the shaft portion 28a to lock the fastening element 28 in a desired position. ("Integrally joined" in this context means joined together to form a unit.) During the assembly of the airbag assembly 20, the primary fastening elements 28:

i. couple the coupling device 300, the airbag 400, and the cover 500 together to form the airbag/cover subassembly 24 (see FIG. 3C);

ii. couple the reaction device 600 to the airbag/cover subassembly 24 to form the reaction/airbag/cover subassembly 26 (see FIG. 4A); and iii. couple the inflator/shield subassembly 22 to the reaction/airbag/cover subassembly 26 to complete the airbag assembly 20 (see FIG. 5A).

Additionally, the design of the airbag assembly 20 eliminates the need for blind rivets and the locking portions 28b of the primary fastening elements 28 are easily visible and accessible for inspection purposes. In this manner, assembly techniques are simplified irrespective of the number of primary fastening elements 28 used in the airbag assembly 20.

In the succeeding subsections, each of the components of the airbag assembly 20 is discussed in detail, followed by a more specific explanation of assembly techniques. An alternate embodiment 20' of an airbag assembly according to the present invention is then described.

The Inflator 100

The inflator 100 includes a cylindrical housing 110 enclosing an inflation fluid source (not shown). (See FIG. 2). ("Cylindrical" in this context refers to a housing having an axial dimension which is substantially greater than its radial dimension.) A radial flange 112 surrounds one axial end of the cylindrical housing 110 and the axial contour of the housing 110 may taper towards this flanged end. The fluid source may constitute a chemical mixture which, when ignited, generates large quantities of an inert gas such as nitrogen.

Figure 2A:
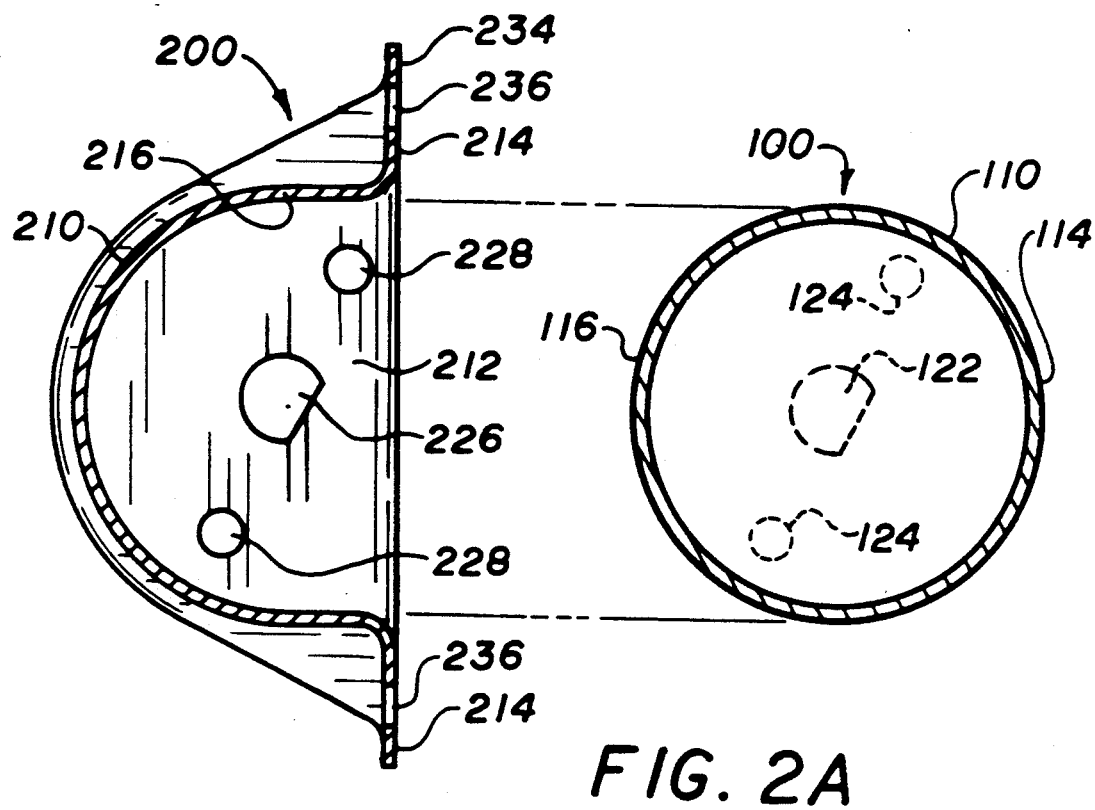
FIG. 2A is a sectional view as seen along line 2A—2A in FIG. 2.
Figure 2B:
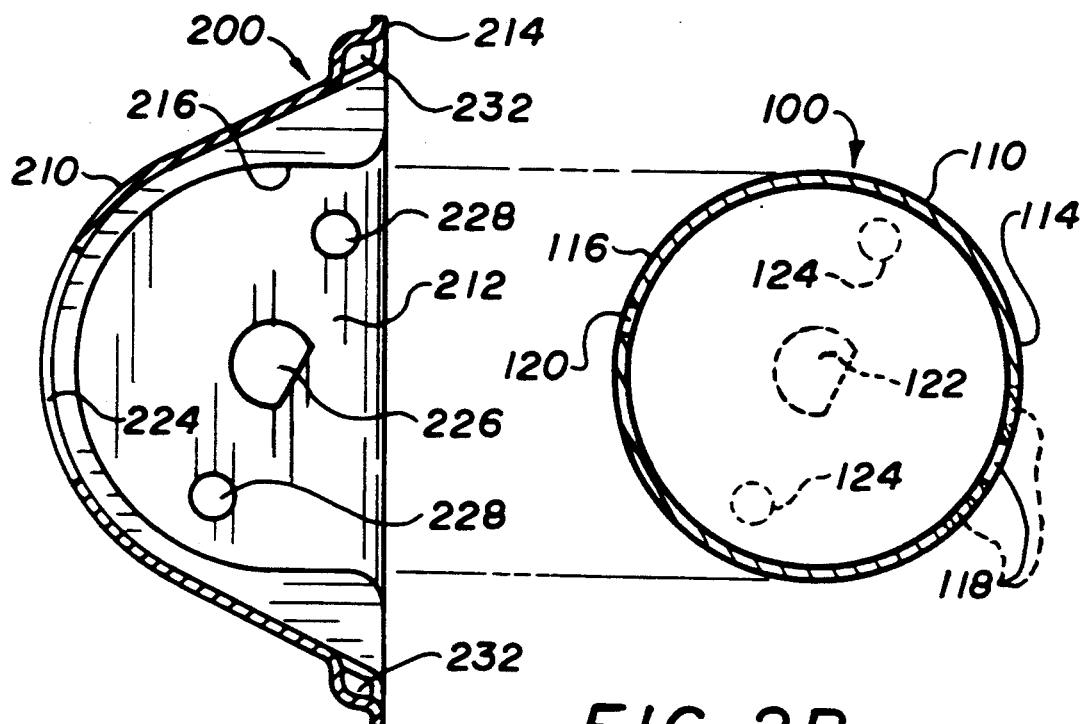
FIG. 2B is a sectional view as seen along line 2B—2B in FIG. 2.

The inflator housing 110 has a front portion 114, which consists of an approximately one hundred and forty degree arc portion of the housing, and a rear portion 116, which consists of the remaining portion of the housing. (See FIGS. 2, 2A, and 2B.) Primary discharge orifices 118 are located on the front portion 114. Secondary discharge orifices 120 are located diametrically opposite of the primary discharge orifices 118 on the rear portion 116. During deployment of the airbag assembly 20, inflation fluid will be released from the housing 110 through the primary discharge orifices 118 to inflate the airbag 400. In the event that the pressure within the housing 110 reaches a predetermined level during this deployment, the secondary discharge orifices 120 will release, or vent, inflation fluid from the housing 110. In the illustrated embodiment, the primary discharge orifices 118 are located in a bottom region of the front portion 114 so that gas will be discharged in a downward direction. (See FIG. 2B.)

The inflator 100 additionally includes coupling members for coupling it to the heat shield 200. In the illustrated embodiment, the coupling members include a projection 122, a pair of projections 124, and a locking member 126. The projections 122 and 124 extend axially from the "non-flanged" end of the cylindrical housing 110. The projection 122 is centrally located, is externally threaded, and preferably has a non-symmetrical cross-sectional geometry. (See FIG. 2.) More preferably, the cross-sectional geometry of the projection 122 is a "D" shape, with the flattened side of the "D" facing towards the primary discharge orifices 118. (See FIGS. 2A and 2B.) The projections 124 are diametrically arranged relative to the central projection 122 and are preferably cylindrical in shape and thus have symmetrical circular cross-sections. The locking member 126 is preferably an internally threaded nut designed to mate with the D-shaped projection 122.

The Heat Shield 200

The heat shield 200 roughly resembles a can having a parabolic cross-section and includes a main wall 210, a side wall 212, and a coupling flange 214. (See FIG. 2, 2A and 2B.) In the inflator/shield subassembly 22, the main wall 210 cradles the rear portion 116 of the inflator housing 110 and the side wall 212 cooperates with the inflator coupling members 122, 124 and 126 to couple the inflator 100 and the heat shield 200 together. (See FIG. 5.) In the completed airbag assembly 20, the coupling flange 214 cooperates with the primary fastening elements 28 to couple the inflator/shield subassembly 22 to the reaction/airbag/cover subassembly 26. (See FIG. 1A.)

Figure 2C:
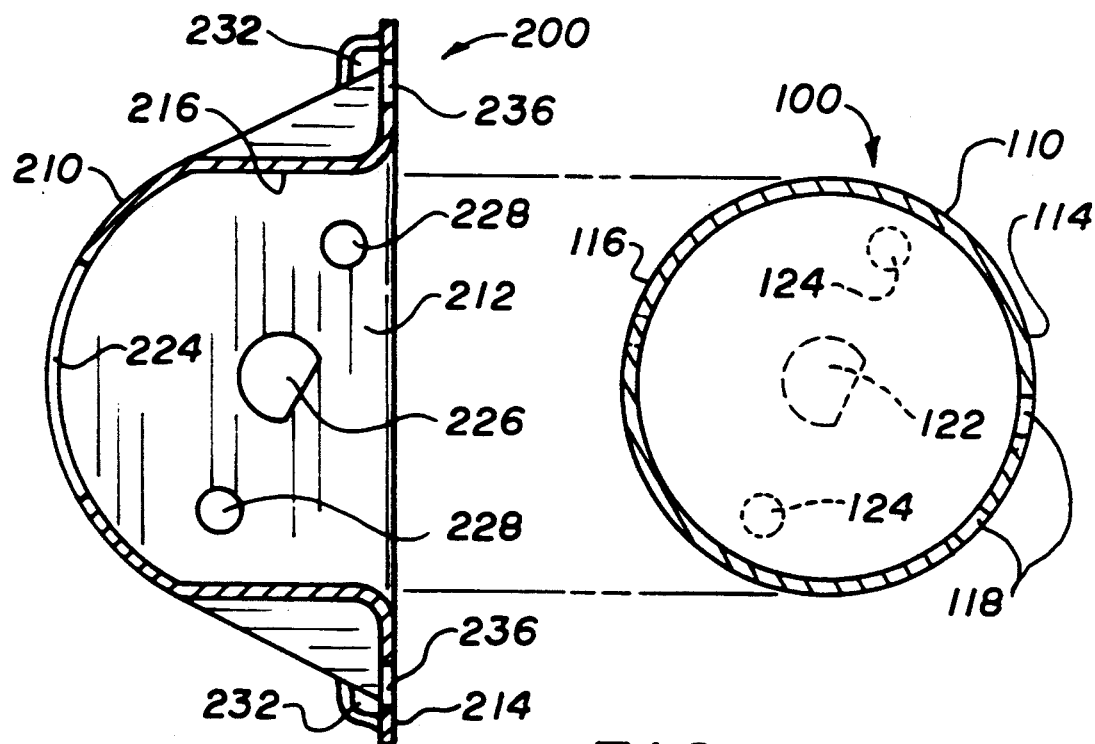
FIG. 2C is a sectional view as seen along line 2C—2C in FIG. 2.

The main wall 210 is generally parabolic in cross-sectional shape and is sized to generously, rather than closely, surround the rear portion 116 of the inflator housing 110. (See FIGS. 2 and 2B.) However, the main wall 210 includes side strap indentations 216 and central tab indentations 218 which cause the wall 210 to deviate from this parabolic shape. (See FIG. 2A and 2C.) Additionally, the main wall 210 includes triangular transitional regions 220 which form transitions between the indentations 216 and 218 and the remaining portions of the main wall 210. (See FIG. 2.)

The side strap indentations 216 are located adjacent the side edges of the main wall 210 and conform to a circular strap shape. (See FIGS. 2 and 2A.) The tab indentations 218 are centrally located adjacent the top/bottom front edges of the main wall 210 and conform to a slightly curved tab shape. (See FIGS. 2 and 2C.) In the inflator/shield subassembly 22, the strap indentations 216 and the tab indentations 218 will tightly clasp certain regions of the rear portion 116 of the inflator housing 110. Specifically, the side strap indentations 216 will clasp circular side regions which are located outwardly of the secondary discharge orifices 120 and the central tab straps 218 will tightly clasp top/bottom tab regions which are located above/below the secondary discharge orifices 120. In this manner, the heat shield 200 tightly clasps the inflator housing 110 while at the same time not interfering with the secondary discharge orifices 120.

The main wall 210 additionally includes a row of oblong openings 224 which are located on a rear region of the wall 210. (See FIGS. 2 and 2B.) In the completed inflator/shield subassembly 22, the openings 224 align with the secondary discharge orifices 120 of the inflator 100. (See FIG. 5B.) The oblong geometry of the openings 224 allow them to accomplish this alignment in a range of inflator orientations. The openings 224 are preferably formed by unidirectional piercing techniques.

The side wall 212 closes one side end of the main wall 210 and thus is parabolic in shape. (See FIGS. 2A, 2B and 2C.) The side wall 212 includes a D-shaped opening 226 and circular openings 228 which, in the completed inflator/shield subassembly 22, receive the inflator coupling members 122 and 124, respectively. The non-symmetrical geometry of the D-shaped opening 226 (and the corresponding inflator coupling member 122) ensures that the inflator 100 is positioned in the desired orientation.

Figure 2D:
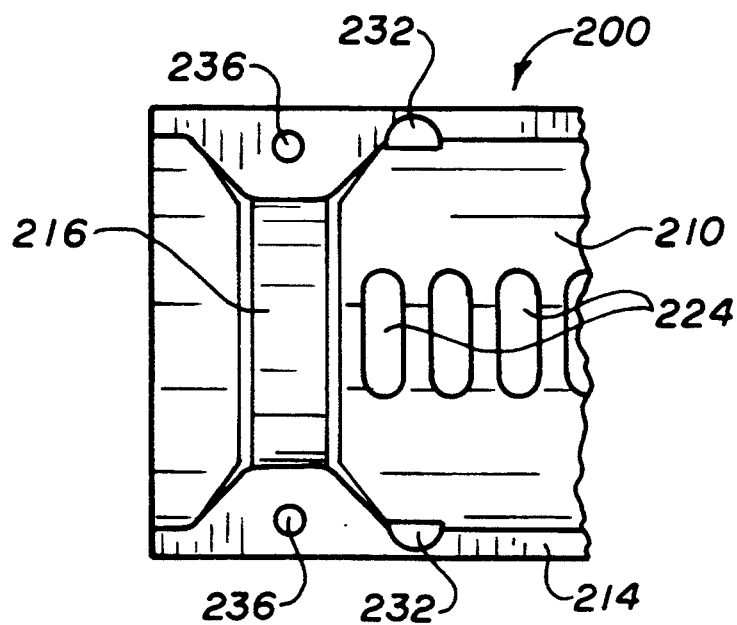
FIG. 2D is a front view as seen along line 2D—2D in FIG. 2.

The coupling flange 214 extends from the front edges of the main wall 210 and the front edge of the side wall 212 to form a three-sided frame. (See FIG. 2.) Except for six trapezoidal portions 230 and four dimples 232, the coupling flange 214 forms a thin border around and roughly perpendicular to the front edges of the walls 210 and 212. (See FIG. 2D.) The trapezoidal portions 230 extend substantially perpendicularly from the indentations 216 and 218 (and adjacent transitional regions 220). The six trapezoidal portions 230 are positioned in substantially the same plane and collectively form the coupling surface for the heat shield 200. Each trapezoidal portion 230 includes a coupling opening 236 which, in the completed airbag assembly 20, receives the shaft portion 28a of a primary fastening element 28. The coupling openings 236 are preferably formed by unidirectional piercing techniques.

The dimples 232 are located just inwardly from the side trapezoidal portions 230, or the portions which extend from the side strap indentations 216. (See FIG. 2.) In the completed airbag assembly 20, the dimples 232 cooperate with alignment members of the cover 500, as is explained in more detail below. (See FIG. 1B.) The dimples 232 are preferably formed during the stamping steps of the fabrication of the heat shield 200.

The Coupling Device 300

Figure 3A:
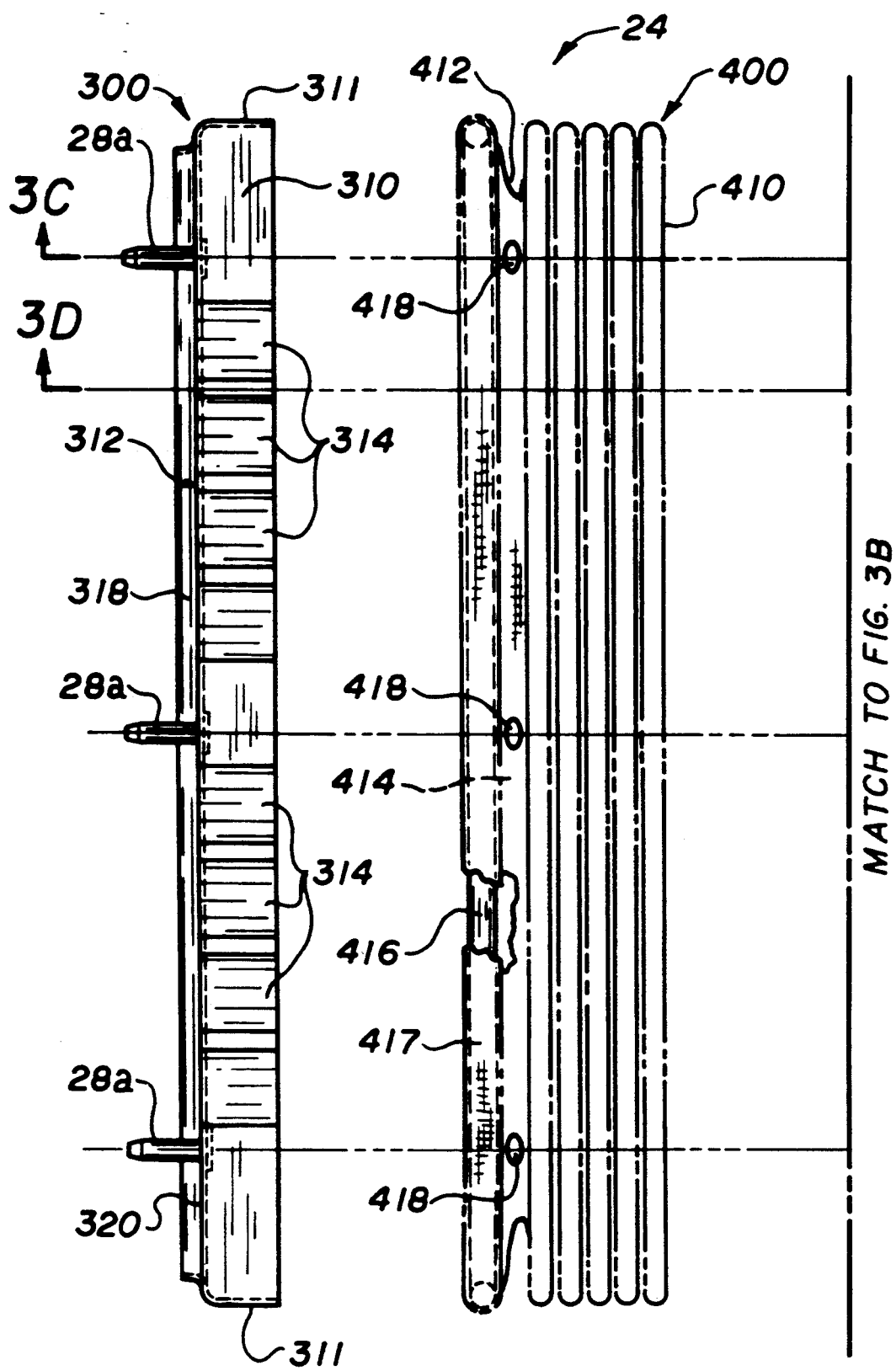
FIGS. 3A and 3B collectively form a top exploded view of an airbag/cover subassembly formed by coupling a coupling devices an airbag, and a cover together.

The coupling device 300 comprises a lid-like structure including top/bottom walls 310, side walls 311, and a rear wall 312. (See FIGS. 3A–3D.) The top/bottom walls 310 extend perpendicularly and frontward from the top/bottom edges of the rear wall 312 (see FIG. 3C and 3D) and include finger-shaped ribs 314 arranged as shown in FIG. 3A. As is explained in more detail below, the ribs 314 cooperate with similar ribs on the reaction device 600 to protect against "fish-mouthing" of the reaction device 600 during deployment of the airbag assembly 20.

The side walls 311 extend perpendicularly and frontward from the side edges of the rear wall 312 and join, at their top/bottom edges, with the top/bottom walls 310. (See FIG. 3C and 3D.)

The rear wall 312 includes an inflator-accommodating portion 316 which comprises a lip 318 surrounding and defining a rectangular opening, and a planar coupling surface 320, which surrounds the lip 318. The opening in the inflator-accommodating portion 316 is designed to accommodate the inflator front portion 114 and is preferably shaped and sized to receive this portion of the inflator housing 110. (See FIGS. 3C and 3D.) The lip 318 projects rearwardly (the opposite direction as the walls 310 and 311) from the coupling surface 320.

The six primary fastening elements 28, or more particularly the shaft portions 28a of these elements, are joined to the coupling surface 320. The shaft portions 28a project rearwardly (the same direction as the lip 320) from top and bottom regions of the coupling surface 320. These shaft portions 28a are preferably integrally joined with the coupling device 300. (See FIG. 3C.) Alternatively, the coupling surface 320 could include six openings sized, shaped and arranged to receive the shaft portions of separate primary fastening elements.

Figure 6:
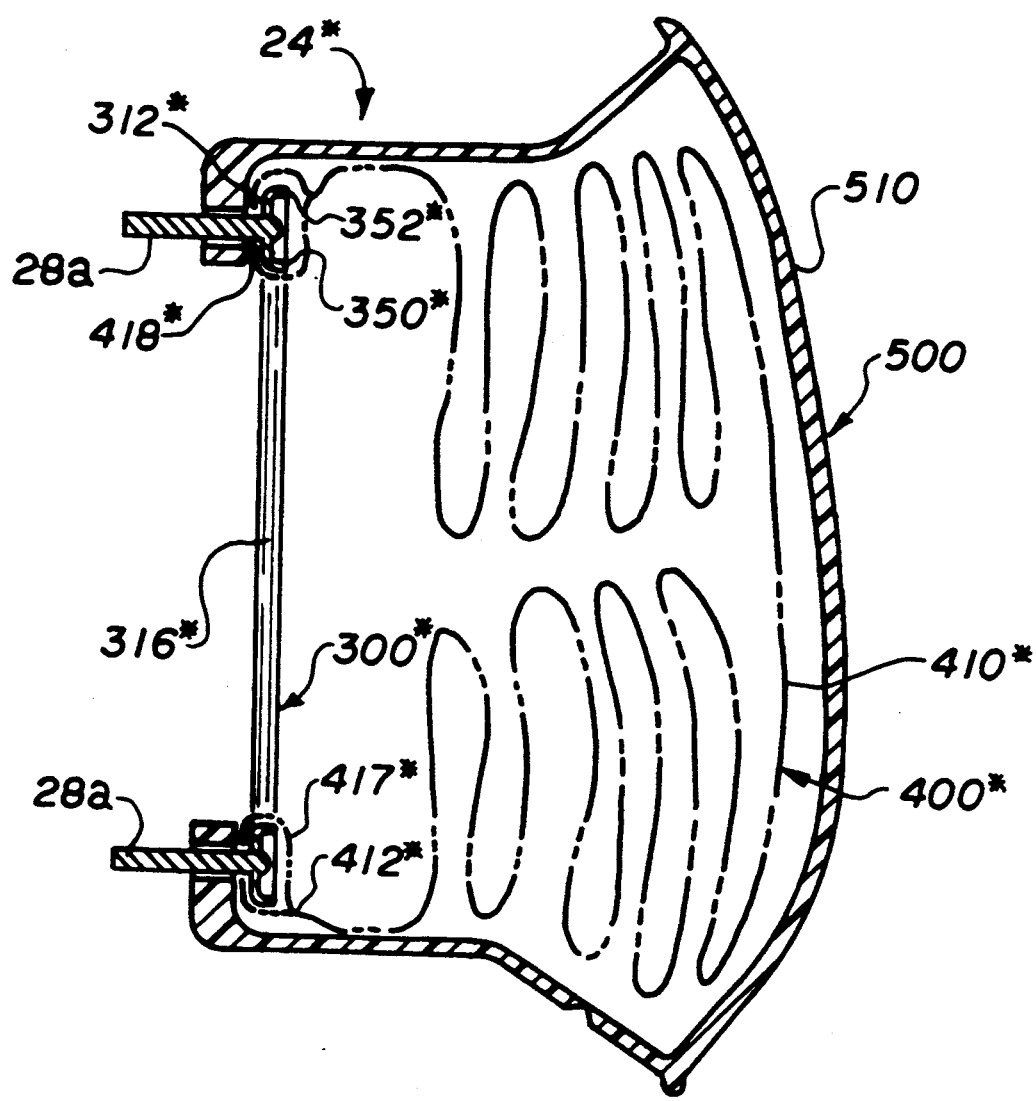
FIG. 6 is a sectional view of a modified form of an airbag/cover subassembly.

In a modified form 24* of the airbag/cover subassembly shown in FIG. 6, the coupling device 300* comprises a rear wall 312* defining an inflator-accommodating opening 316*. The inflator-accommodating opening 316* is shaped and sized to receive the front portion 114 of the inflator housing 110. An inner lip 350* extends frontwardly around the rectangular opening and an outer lip 352* extends frontwardly around the peripheral edge of the rear wall 312*. The rear wall 312* includes the planar coupling surface and the shaft portions 28a of the primary fastening elements project rearwardly from top and bottom regions of this coupling surface. The shaft portions 28a are preferably integrally joined with the coupling device 300*. Alternatively, the coupling surface could include six openings sized, shaped, and arranged to receive separate primary fastening elements.

The Airbag 400

The airbag 400 comprises a bag 410 which is formed from a suitable flexible fabric such as nylon and which has a mouth portion 412 defining a fluid inlet opening 414. (See FIG. 3A–3D.) The airbag 400 additionally includes a retaining member 416 which is joined to the mouth portion 412 in a suitable manner. In the illustrated and preferred manner, the retaining member 416 is securely enclosed within a hem 417 formed in the mouth portion 412 of the bag 410. The retaining member 416 may comprise a cord possessing elastic properties. Alternatively, the retaining member 416 may comprise a non-elastic band made of material such as nylon or stainless steel.

The mouth portion 412 of the bag 410 has six coupling openings 418 sized and arranged to receive the primary fastening elements 28, or more particularly the shaft portions 28a of these elements. The coupling openings 418 are preferably located so that the retaining member 416 is positioned between the openings 418 and the fluid inlet 414. In the completed airbag/cover subassembly 24, the coupling device 300 is positioned within the bag 410, the shaft portions 28a project through the openings 418, and the retaining member 416 is captured between the coupling device's lip 318 and the shaft portions 28a. (See FIG. 4A.)

In the modified form 24* of the airbag/cover subassembly shown in FIG. 6, the airbag 400* comprises a fabric bag 410* which has a mouth portion 412* defining a fluid inlet opening. The coupling device 300* is directly joined to the airbag 400*, such as by securely enclosing it within a hem 417* formed in the mouth 412* of the bag 410*. The hem 417* includes six coupling openings 418* sized and arranged to receive the primary fastening elements 28, or more particularly the shaft portions 28a of these elements. In the completed airbag/cover subassembly 24*, the shaft portions 28a project through the openings 418* and the coupling device 300* essentially also functions as a retaining member for the airbag 400*.

The Cover 500

The geometry of the cover 500 is best described by referring to the relevant drawings. (See FIGS. 3B–3D and 3G.) It may be generally described as a trough-like structure having a roughly "U" shaped cross-section. This structure is formed by a front wall 510, side walls 512, and top/bottom walls 514. Preferably, the cover 500 is formed in one piece from a material, such as polyvinylchrloride, which is typically used to mold vehicle instrument panels.

As is perhaps best understood by referring briefly back to FIG. 1, the front wall 510 of the cover 500 will usually be visible once the completed airbag assembly 20 is installed in a vehicle. For this reason, the front wall 510 is preferably designed to match the instrument panel of the vehicle in which the airbag assembly 20 will be installed. In the illustrated embodiment, the front wall 510 has a substantially rectangular shape (see FIG. 1) and is slightly curved (see FIGS. 3C and 3D).

The side walls 512 basically span the area between the front wall 510 and the top/bottom walls 514 and thus have an appropriate geometry to accomplish this purpose. (See FIG. 3G.) Preferably, the side walls 512 are joined with the top and bottom walls 514 at their top and bottom edges, but are not joined to the front wall 510 at their front edges. In this manner, the front wall 510 may easily separate from the side walls 512 during deployment of the airbag assembly 20.

The top and bottom walls 514 each include a proximate portion 516, a distal portion 518, and a coupling flange 520. (See FIGS. 3C and 3D.) The proximate portions 516 are angled inwardly from the top/bottom edge of the front wall 510, the distal portions 518 extend from the proximate portions 516 and are generally parallel to each other, and the coupling flanges 520 extend perpendicularly inwardly from the free ends of the distal portions 518. The bottom proximate portion 516 includes a designed weakness in the form of a V-shaped notch 522. During deployment of the airbag assembly 20, the cover 500 will separate at the notch 522 to allow the front wall 510 to pivot upwardly to create an opening for the inflating airbag 400.

Figure 3B:
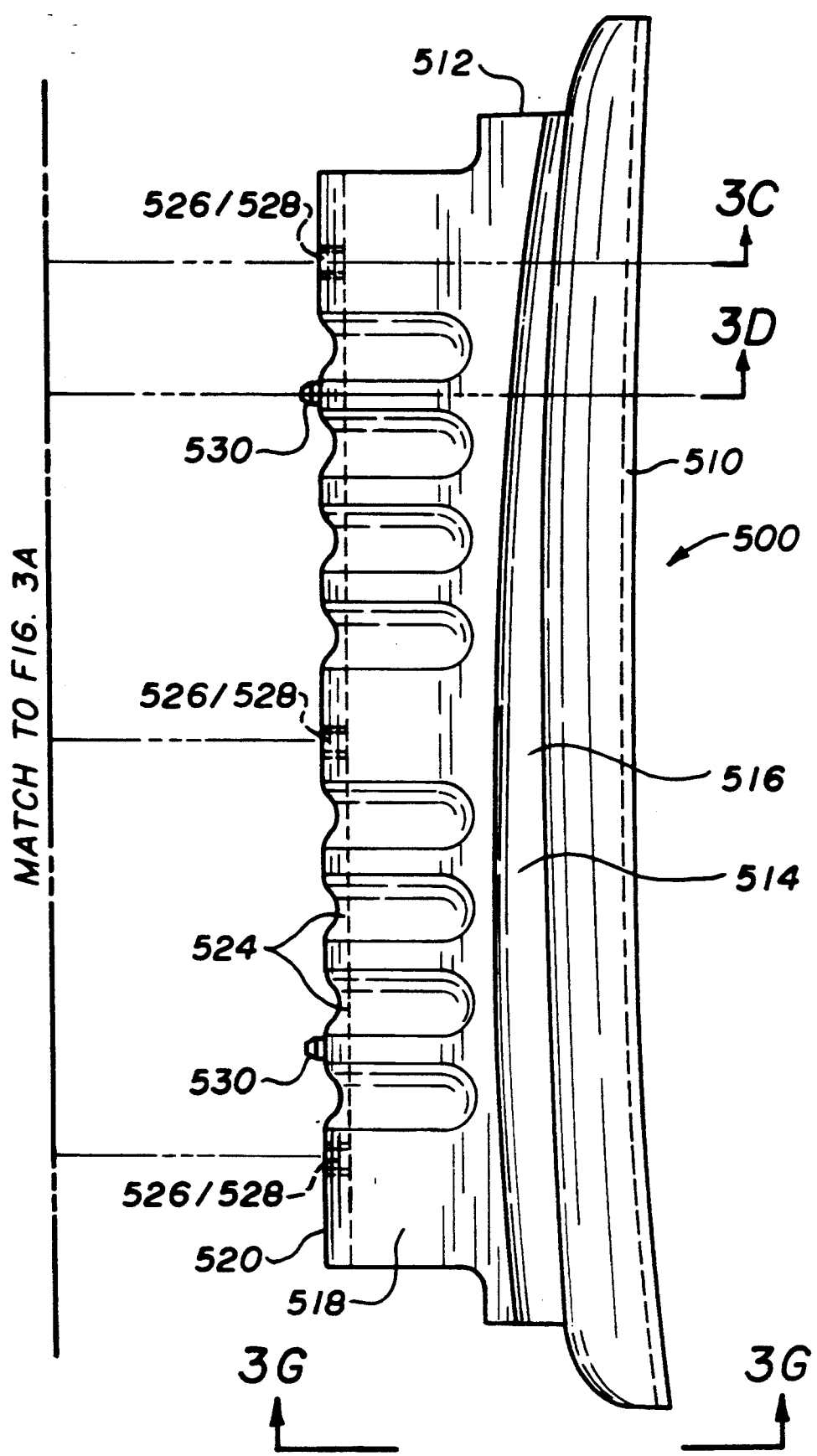
Figure 3D:
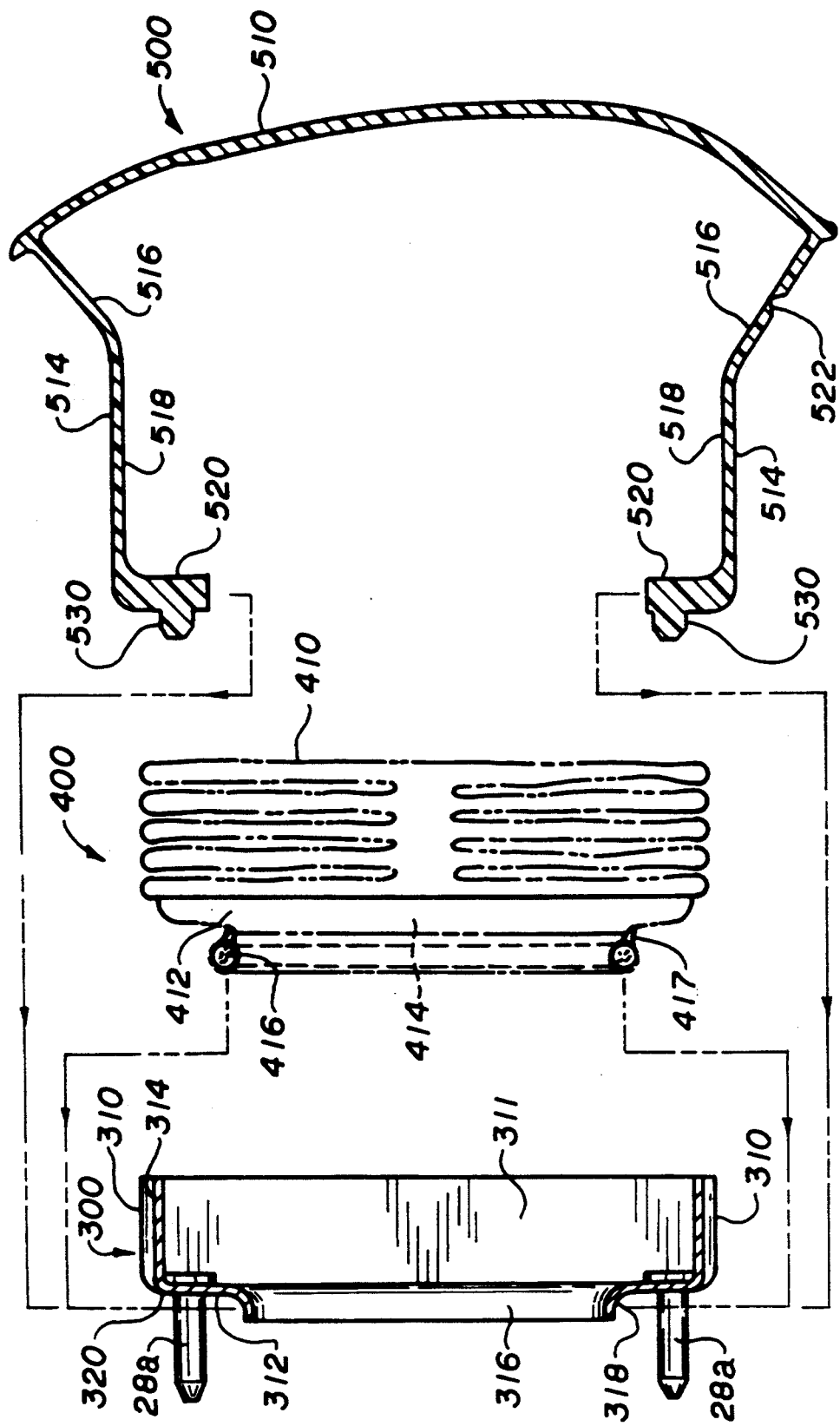
FIG. 3D is a sectional view as seen along line 3D—3D in FIGS. 3A and 3B.
Figure 3G:
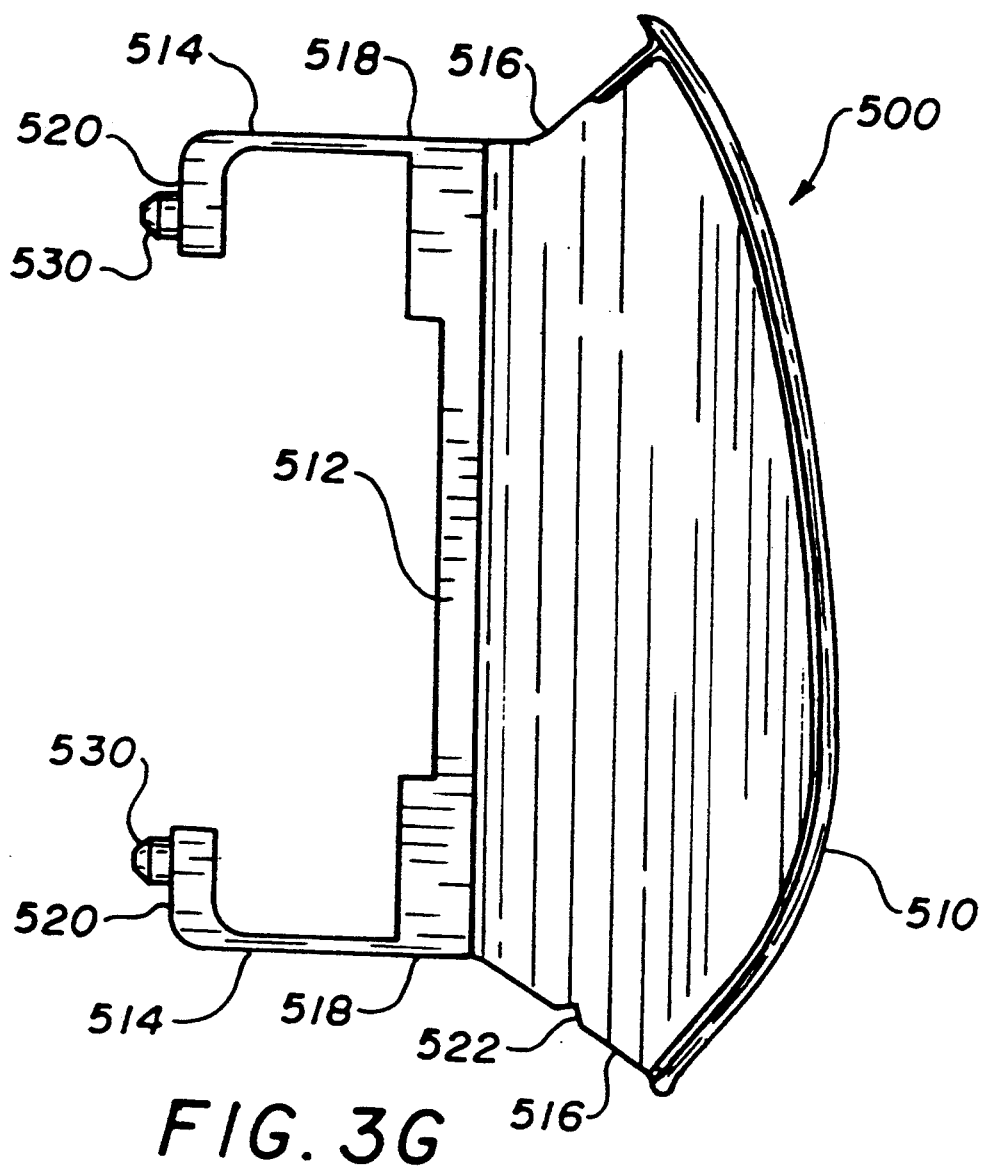
FIG. 3G is a side view as seen along line 3G—3G in FIG. 3B.

Both the top and bottom distal portions 518 include finger-shaped depressions 524 arranged as shown in FIG. 3B. In the airbag/cover subassembly 24, the distal portions 518 are positioned adjacent the top and bottom walls 310 of the coupling device 300. (See FIGS. 4A and 4B.) In the reaction/airbag/cover subassembly 26, the distal portions 518 are sandwiched between the top/bottom walls of the coupling device 300 and the reaction device 600. (See FIGS. 5A and 5B.) The depressions 524 conform to the ribs 314 on the coupling device 300 and also with similar ribs on the reaction device 600. In this manner, the depressions 524 function as alignment members during the assembly of the airbag/cover subassembly 24 and/or during assembly of the reaction/airbag/cover subassembly 26.

The top coupling flange 520 includes three openings 526 and the bottom coupling flange 520 includes three openings 528. In the airbag/cover subassembly 24, these six openings 526/528 receive the six primary fastening elements 28, or more particularly the shaft portions 28a of these elements. The top openings 526 are in the form of closed circular openings through which the shaft elements 28a must be inserted. (See FIG. 3E.) The bottom openings 528 are in the form of omega-shaped, or key-slot, unclosed openings which may be snapped about the shaft portions 28a. (See FIG. 3F.) This arrangement of the openings (i.e., the closed openings 526 on top and the unclosed openings 528 on the bottom) is chosen because the cover 500 pivots upwardly during deployment of the airbag assembly 20.

Each of the coupling flanges 520 includes two alignment members, or projections, 530 located adjacent to the side, or outer, openings 526/528. (See FIGS. 3B and 3D.) The projections 530 are preferably molded with the remainder of the coupling flange 520. In the completed airbag assembly 20, the projections 530 will be received by the dimples 232 in the heat shield 200. (See FIGS. 1B.) Additionally, (as is explained in more detail below) the projections 530 cooperate with certain features of the reaction device 600 during assembly of the reaction/airbag/cover subassembly 26.

The Reaction Device 600

The reaction device 600 comprises a box-shaped structure including top/bottom walls 610, side walls 611 and a rear wall 612. (See FIGS. 4, 4A, and 4B.) In the reaction/airbag/cover subassembly 26, the coupling device 300 is positioned within the cavity formed by the walls of the reaction device 600 and appropriate portions of the airbag 400 and the cover 500 are sandwiched between the walls of the reaction device 600 and the walls of the coupling device 300. (See FIGS. 5A and 5B.) The reaction device 600 is accordingly sized similar to, but larger than, the coupling device 300.

The top/bottom walls 610 extend perpendicularly to and frontward from the top/bottom edges of the rear wall 612 and include finger-shaped ribs 614 arranged as shown in FIG. 4. The ribs 614 cooperate with the ribs 314 of coupling device 300 to protect against "fishmouthing" of the reaction device 600 during deployment of the airbag assembly 20. In the reaction/airbag/cover subassembly 26, the depressions 524 of the cover 500 are sandwiched between the ribs 314 and 614. (See FIGS. 5A and 5B.)

The side walls 611 extend perpendicularly to and frontward from the side edges of the rear wall 612 and join, at their top/bottom edges, with the top/bottom walls 610. (See FIGS. 5A and 5B.)

The rear wall 612 includes an inflator-accommodating portion 616 and a coupling portion 618 which surrounds the inflator-accommodating portion 616. The inflator-accommodating portion 616 could simply define a rectangular opening sized to receive the front portion 114 of the inflator housing 110. However, in the preferred embodiments the inflator-accommodating portion 616 comprises a curved impression which conforms to the outer contour of the inflator's front portion 114, including the front portion of the inflator flange 112. (See FIG. 4.)

The curved impression includes a series of openings 619 which, in the completed airbag assembly 20, align with the primary discharge orifices 118 of the inflator 100. (See FIG. 4B.) (Because the illustrated airbag assembly 20 is designed to direct the inflation fluid in a downward direction, the openings 619 are downwardly offset, rather than centrally located, on the inflator-accommodating portion 616.) The reaction device's openings 619 are preferably substantially larger in area than the inflator's primary discharge orifices 118 so that exact alignment is not necessary. Additionally, the locking portions 28b of the primary fastening elements 28 are preferably chosen so that they cannot pass through the reaction device's openings 619. This latter feature guards against inadvertent misplacement of the locking portions 28b during the assembly process. The openings 619 may be formed by unidirectional piercing techniques.

The coupling portion 618 surrounds the inflator-accommodating portion 616 and constitutes a generally planar surface. (See FIGS. 4, 4A, and 4B.) Top and bottom regions of the coupling portion collectively constitute the coupling surface of the reaction device 600. The coupling surface includes six coupling openings 620 which are sized, shaped and arranged to receive the primary fastening elements 28, or more particularly the shaft portions 28a of these elements. (See FIG. 5A.) The coupling surface additionally includes four opening 622 which are located inwardly adjacent to the side, or outer, openings 620. In the reaction/airbag/cover subassembly 26, the openings 622 receive the cover projections 530. (See FIG. 5.) The openings 620 and 622 are preferably formed by unidirectional piercing techniques.

As was indicated above, the reaction device 600 is designed to be coupled, via mounting brackets 21, to the support structure for the vehicle instrument panel. (See FIG. 1.) However, for certain vehicles, a modified form 600* of the reaction device shown in FIG. 7 may be more desirable. (Like reference numbers are used to designate like parts of the reaction device 600 and the reaction device 600*, with the parts of the reaction device 600* being followed by a single asterisk (*) superscript.) In the reaction device 600*, the mounting brackets 21 are eliminated and a peripheral mounting flange 650* is provided for direct coupling to the vehicle instrument panel. The reaction device 600* may be particularly advantageous if it is formed by the preferred stamping process because this fabrication process would necessarily produce such a flange. By eliminating the mounting brackets 21, the welding steps required to attach these brackets to the reaction device are avoided.

Alternatively, if the mounting brackets 21 are used, they may have to be welded to the reaction device in a separate assembly step. Consequently, if welding steps cannot be completely avoided, the reaction device 600 shown in FIG. 8 may be more economical to manufacture. (Like reference numbers are used to designate like parts of the reaction device 600 and the reaction device 600, with the parts of the reaction device 600 be followed by a double asterisk () superscript.) In the reaction device 600**, the side walls 611* are welded to the top/bottom walls 610. The relevant openings in the reaction device 600 would still preferably be formed by unidirectional piercing techniques.

G. Assembly

One step in the assembly of the airbag assembly 20 comprises coupling the inflator 100 to the heat shield 200 to form the inflator/shield subassembly 22. (See FIGS. 2, 2A and 2B.) In this step, the inflator 100 is inserted into the cavity formed by the main wall 210 of the heat shield 200. The inflator 100 is then manipulated so that the inflator coupling members, or projections, 122 and 124 are completely inserted into the openings 226 and 228 in the heat shield's side wall 212. The inflator 100 and the heat shield 200 are designed so that this insertion results in the inflator 100 being correctly oriented relative to the heat shield 200. The inflator 100 may then be locked in this position by mating the locking member 126 with, or screwing it to, the distal end of the D-shaped projection 122 which extends outwardly from the side wall 212.

In the inflator/shield subassembly 22, the front portion 114 of the inflator 100 protrudes from the heat shield 200 and the primary discharge orifices 118 point in the desired direction. (See FIGS. 5 and 5B.) Additionally, the rear portion 116 of the inflator 100 is completely shielded by the heat shield 200 and the second discharge orifices 120 are aligned with the oblong openings 224 in the rear region of the main wall 210. (See FIG. 5B.) Still further, the indentations 216 and 218 of the heat shield 200 tightly clasp the appropriate regions of the inflator rear portion 116. (See FIG. 5A.)

Another step in the assembly of the airbag assembly 20 comprises coupling the coupling device 300, the airbag 400, and the cover 500 together to form the airbag/cover subassembly 24. (See FIGS. 3A–3B.) In this assembly step, the shaft portions 28a of the primary fastening elements 28 are joined to the coupling device 300. Preferably, this joining step is accomplished during the fabrication of the coupling device 300 and the shaft portions 28a are integrally joined with the coupling device 300.

The airbag mouth portion 412 is then positioned around the coupling device 300 and the shaft portions 28a of the primary fastening elements are inserted through the airbag openings 418. If the retaining member 416 constitutes an elastic cord, this positioning may be accomplished by stretching the retaining member 416 and pulling the mouth portion 412 around the coupling device 300. If the retaining member 416 comprises a non-elastic cord, the coupling member 300 may be inserted into the fluid inlet 414 of the bag 410 and then maneuvered into the proper position. When the airbag 400 is properly positioned relative to the coupling device 300, the retaining member 416 is situated between the lip 320 and the shaft portions 28a. (See FIG. 4A.)

If the alternate airbag/subassembly 22* is used, the shaft portions 28a of the primary fastening elements 28 are joined (preferably integrally) to the coupling device 300*. The coupling device 300* is then coupled to the airbag 400* (preferably by securing it within the hem 417* of the bag 410*) and the shaft portions 28a of the primary fastening elements 28 are inserted through the airbag openings 418*.

After the airbag 400 is properly coupled to the coupling device 300, the cover 500 is coupled to the coupling device 300 to complete the airbag/cover subassembly 24. Specifically, the distal portions 518 of the cover top/bottom walls 514 are positioned adjacent the top and bottom walls 310 of the coupling device 300. (See FIGS. 4A and 4B.) Additionally, although not particularly shown in the drawings, analogous portions of the cover side walls 512 will be positioned adjacent the side walls 311 of the coupling device 300. This positioning is preferably accomplished by inserting the shaft portions 28a of the top three primary fastening elements 28 through the closed top openings 526, pulling the cover 500 around the coupling device 300 and the airbag 400, and then snapping the shaft portions 28a of the bottom three primary fastening elements 28 through the key-slot bottom openings 528. (Similar assembly steps would be used if the alternate form 24* of the airbag/cover subassembly is used.)

In the completed airbag/cover subassembly 24, the airbag fluid inlet 414 is aligned with the inflator-accommodating portion 316 of the coupling device 300. The mouth portion 412 of the bag 410 is captured between the coupling device 300 and the cover 500, and the remaining portion of the bag 410 is folded within a cavity formed by the walls of the cover 500. (See FIGS. 4A and 4B.) The retaining member 416 is situated between the lip 318 of the coupling device 300 and the free ends of the coupling flanges 520 of the cover top/bottom walls 514.

Additionally, in the completed airbag/cover subassembly 24, the finger-shaped depressions 524 of the cover top/bottom walls 310 will be aligned with the similarly shaped ribs 314 of the coupling device 300. (See FIG. 4.) (In fact, the depressions 524 and the ribs 314 encourage correct alignment of the cover 500 relative to the coupling device 300 during assembly of the airbag/cover subassembly 24.) The shaft portions 28a of the primary fastening elements 28 will extend rearwardly from the coupling flanges 520 of the cover top/bottom walls 514 (see FIGS. 4 and 4A) and the projections 530 will extend in a similar manner (see FIGS. 4 and 4B).

The airbag/cover subassembly 24 is then coupled to the reaction device 600 to form the reaction/airbag/cover subassembly 26. (See FIGS. 4, 4A and 4B.) Specifically, the coupling device 300, and coupling portions of the airbag 400 and the cover 500, are received within the cavity formed by the walls of the reaction device 600. The shaft portions 28a of the primary fastening elements 28 are inserted through the coupling openings 620 in the coupling portion 618 (see FIG. 4A) and the cover projections 530 are inserted through the openings 622 in the coupling portion 618 (see FIG. 4B). (Identical assembly steps would be used if one of the alternate forms 600* and 600* of the reaction device is used and/or similar assembly steps would be used if the alternate form 24* of the airbag/cover subassembly is used.)

In the completed reaction/airbag/cover subassembly 26, the inflator-accommodating portion 616 of the reaction device 600 extends through the inflator-accommodating portion 316 of the coupling device 300 and through the airbag fluid inlet 414. The airbag retaining member 416 is trapped between the coupling portion 618 of the reaction device's rear wall 612, the lip 318 of the coupling device 300, and the free ends of the coupling flanges 520 of the cover top/bottom walls 514. The coupling flanges 520 of the cover top/bottom walls 514 are captured between the rear walls 312 and 612 of the coupling device 300 and the reaction device 600.

Additionally, in the completed reaction/airbag/cover subassembly 26, the distal portions 518 of the cover top/bottom walls 514 are captured between the top/bottom walls 310 and 610 of the coupling device 300 and the reaction device 600. The cover depressions 524 are sandwiched between the ribs 314 and 614 on the coupling device 300 and the reaction device 600. The shaft portions 28a of the primary fastening elements 28 extend rearwardly from the coupling portions 618 of the reaction device's rear wall 612 (see FIGS. 5 and 5A) and the cover projections 530 extend in a similar manner (see FIGS. 5 and 5B).

Once the reaction/airbag/cover subassembly 26 has been completed, the inflator/shield subassembly 22 may be coupled to the subassembly 26 to complete the airbag assembly 20. (See FIG. 5.) This completion of the airbag assembly 20 may occur immediately after, and at the same location as, the completion of the reaction/airbag/cover subassembly 26. Alternatively, the coupling of the inflator/shield subassembly 22 to the reaction/airbag/cover subassembly 26 may be postponed and- /or performed at a different location if manufacturing needs so dictate. In this manner, the incorporation of the inflator 100 into the airbag assembly 20 may or may not be delayed depending on manufacturing needs.

To couple the inflator/shield subassembly 22 to the reaction/airbag/cover subassembly 26, the shaft portions 28a of the primary fastening elements 28 are inserted through the openings 236 in the heat shield's coupling flange 214. (See FIG. 5A.) Simultaneously, the cover projections 530 will be received by the dimples 232 in the coupling flange 214. (See FIG. 5B.) In this coupled arrangement, the front portion 114 of the inflator housing 110 is positioned within the inflator-accommodating portion 616 of the reaction device 600 and the primary discharging orifices 118 will be aligned with the openings 619. (See FIG. 1B.)

Additionally, in the above-described coupled arrangement, the shaft portions 28a of the primary fastening elements 28 will extend rearwardly from the heat shield's coupling flange 214. The locking portions 28b of the primary fastening elements 28 may then be mated with the exposed sections of the shaft portions 28a to lock the airbag assembly 20 in the assembled condition. (The indentations 216 and 218 on the heat shield's main wall 210 allow for convenient manipulation of the locking portions 28b.) In the preferred embodiment, the locking portions 28b are welded to the shaft portions 28a to produce a tamperproof lock. Because blind rivets are not necessary, the locking portions 28a of the primary fastening elements 28 are easily visible and accessible for inspection purposes. Additionally, because the component coupling surfaces are located in parallel planes, and the locking portions 28b of the primary fastening elements 28 may be driven in a single direction and, in the preferred embodiment, welded in a single plane.

The Airbag Assembly 20'

Figure 9:
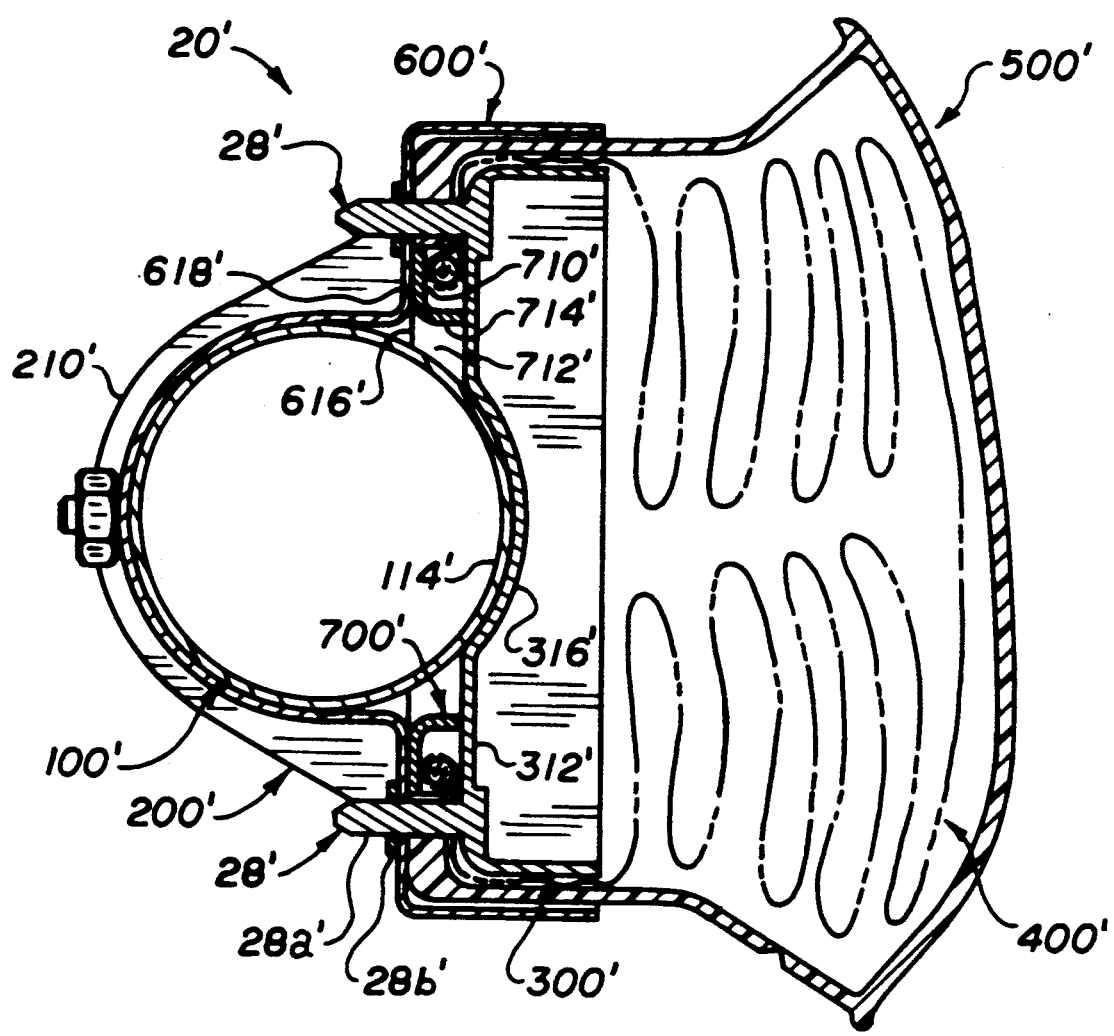
FIG. 9 is a sectional view of another airbag assembly according to the present invention.

Referring now additionally to FIG. 9, an airbag assembly 20' according to another embodiment of the invention is shown. The airbag assembly 20' is similar in many ways to the airbag assembly 20 and includes an inflator 100', a heat shield 200', a coupling device 300', an airbag 400', a cover 500', a reaction device 600', and a deflecting device 700'. The inflator 100', the airbag 400', and the cover 500' are essentially identical to the analogous components of the airbag assembly 20, and thus will not be described in detail. The remaining components of the airbag assembly 20' are similar (although not identical) to the analogous components in the airbag assembly 20. Accordingly, like reference numerals will be used to designate analogous parts, with the reference numerals designating the parts of the airbag assembly 20' being followed by a prime (') suffix.

In contrast to the airbag assembly 20, in the airbag assembly 20', the heat shield 200' and the reaction device 600' are formed in one piece. Otherwise, the heat shield 200' is essentially identical to the heat shield 200 except that it does not include a coupling flange 214. Instead, the front edges of the main wall 210' integrally join with the coupling portion 618' of the reaction device 600'. The reaction device 600' is essentially identical to the reaction device 600, except that the inflator-accommodating portion 616' defines a rectangular opening sized and shaped to receive the front portion 114' of the inflator housing 110'. The combined heat shield/reaction device 200'/600' is preferably formed by stamping and further processed by unidirectional piercing techniques.

The coupling device 300' is essentially identical to the coupling device 300 except that its rear wall 312' does not include a lip 318. Additionally, the inflator-accommodating portion 316' comprises a curved impression which conforms to the outer contour of a central section of the inflator's front portion 114'. The curved impression includes a series of openings (not shown) which, in the completed airbag assembly 20', align with the inflator primary discharge orifices. The coupling device 300' is preferably formed by stamping and further processed by unidirectional piercing.

The deflecting device 700' comprises a rectangular main wall 710' having an inflator-accommodating portion 712' in the form of a rectangular opening. A frontwardly extending lip 714' surrounds the opening 712'. In the completed airbag assembly 20', the deflecting device 700' is positioned between the coupling portion 618' of the reaction device's rear wall 612' and the coupling surface 320' of the coupling device's rear wall 312'. As is best explained by referring to the drawing, the defecting device 700' forms a physical barrier between the inflator-accommodating opening 616' and the coupling portions of the airbag 400' and the cover 500'. In this manner, the deflecting device 700' deflects inflation fluid away from the coupling portions of the airbag 400 and the cover 500, and directs the inflation fluid toward the airbag fluid inlet 414' during deployment of the airbag assembly 20'.

To assemble the airbag assembly 20', the inflator 100' is coupled to the combined heat shield/reaction device 200'/600' to form a reaction/inflator/shield subassembly. In a separate assembly step, the coupling device 300', the airbag 400', and the cover 500' are coupled together to form an airbag/cover subassembly. Thereafter, the airbag/cover subassembly, the reaction/inflator/shield subassembly, and the deflector device 700' are coupled together to complete the airbag assembly 20'. As such, the incorporation of the reaction/inflator/shield subassembly (and therefore the inflator 100') into the airbag assembly 20' may or may not be delayed depending on manufacturing needs.

The components of the airbag assembly 20' are also designed so that the number of fastening elements is minimized and preferably consist essentially of six primary fastening elements 28'. Each fastening element 28' comprises a shaft portion 28a', which is preferably integrally joined with the coupling device 300', and a locking portion 28b', which mates with shaft portion 28a' to lock the fastening element 28' in a desired position. During the assembly of the airbag assembly 20', the primary fastening elements 28':

i. couple the coupling device 300', the airbag 400', and the cover 500' together to form the airbag/cover subassembly; and ii. couple the airbag/cover subassembly, the reaction/inflator/shield subassembly and the deflecting device 700' together to complete the airbag assembly 20°.

Additionally, as with the design of the airbag assembly 20, the design of the airbag assembly 20' eliminates the need for blind rivets and component coupling surfaces are located in parallel planes. In this manner, assembly techniques are simplified irrespective of the number of primary fastening elements used in the airbag assembly 20'.

Closing

One may now appreciate that the present invention provides an airbag assembly which: avoids the complicated fabrication techniques associated with multi-piece structures and/or multi-directional piercing; allows the incorporation of the inflator into the airbag assembly at a later time and/or different location than the other components of the airbag assembly; and minimizes the number of fastening elements and eliminates the need for blind rivets.

Although the invention has been shown and described with respect to certain preferred embodiments, it is obvious that equivalent alterations and modifications will occur to others skilled in the art upon the reading and understanding of this specification. The present invention includes all such equivalent alterations and modifications and is limited only by the scope of the following claims.

It should be noted that certain relational terms such as front, rear, top, bottom, side, etc. have been used in the description of the preferred embodiment of the invention and these terms are also used in the following claims. The use of these terms is for the sake of clarity only and is not meant to limit the invention to a particular orientation.

What is claimed is:

1. An airbag assembly comprising an inflator/shield subassembly, a coupling device, an airbag, a cover and a reaction device;
   said inflator/shield subassembly being positioned to supply inflation fluid to said airbag;
   said coupling device, said airbag, said inflator/shield subassembly and said cover being coupled to said reaction device with a set of fastening elements each of which extends through portions of said airbag, said cover, said reaction device and said inflator/shield subassembly.

2. An airbag assembly as set forth in claim 1, wherein said inflator/shield subassembly further comprises a heat shield which cradles a portion of an inflator and which is coupled to said reaction device by said fastening elements.

3. An airbag assembly as set forth in either claim 1 or claim 2 wherein said fastening elements each comprise a shaft portion and a locking portion which mates with said shaft portion to lock said fastening element in a desired position and wherein said locking portions are situated exterior of said reaction device.

4. An air bag assembly as set forth in claim 3 wherein said shaft portions of said fastening elements are integrally joined to said coupling device.

5. An airbag assembly comprising an inflator/shield subassembly, a coupling device, an airbag, a cover, and a reaction device;
   said inflator/shield subassembly being positioned to supply inflation fluid to said airbag;
   said reaction device including a rear wall having an inflator-accommodating portion which receives a front portion of said inflator/shield subassembly;
   said coupling device, said airbag, said inflator/shield subassembly and said cover being coupled to said reaction device with a set of fastening elements; and
   each of said fastening elements extending through portions of said airbag, said cover, said inflator/shield subassembly and said rear wall of said reaction device.

6. An airbag assembly as set forth in claim 5 wherein:
   said coupling device includes a rear wall having an inflator-accommodating portion, which receives said front portion of said inflator, and a planar coupling surface, which surrounds said inflator-accommodating portion;
   said rear wall of said reaction device includes a planar coupling surface which surrounds its inflator-accommodating portion;
   said fastening elements are joined to said coupling surface of said coupling device;
   said fastening elements extend through said coupling surface of said reaction device; and
   said coupling surface of said coupling device and said coupling surface of said reaction device are disposed in planes parallel to each other.

7. An airbag assembly as set forth in claim 6 wherein said inflator-accommodating portion of said coupling device defines a rectangular opening shaped and sized to receive said front portion of said inflator housing.

8. An airbag assembly as set forth in claim 6 wherein:
   said airbag comprises a bag which is formed from a flexible fabric and which has a mouth portion defining a fluid inlet opening;
   said mouth portion includes coupling openings sized and arranged to receive portions of said fastening elements;
   said cover comprises a coupling flange including coupling openings which receive said portions of said fastening elements; and
   said mouth portion and said cover coupling flange are sandwiched between said rear wall of said coupling device and said rear wall of said reaction device.

9. An airbag assembly as set forth in claim 8 wherein said airbag additionally includes a retaining member which is joined to said mouth portion, said retaining member being positioned between said fluid inlet opening and said coupling openings of said airbag.

10. An airbag assembly as set forth in claim 5 wherein said inflator-accommodating portion of said reaction device comprises a curved impression which conforms to the outer contour of said front portion of said inflator/shield subassembly.

11. An airbag assembly as set forth in claim 5 wherein said inflator-accommodating portion of said reaction device defines a rectangular opening sized and shaped to receive said front portion of said inflator/shield subassembly.

12. An airbag assembly as set forth in claim 5 further comprising mounting brackets attached to said reaction device and adapted to mount said reaction device to a vehicle instrument panel.

13. An airbag assembly as set forth in claim 5 wherein said reaction device consists essentially of a monolithic structure.

14. An airbag assembly as set forth in claim 5 wherein portions of said cover are sandwiched between said reaction device and said coupling device.

15. An airbag assembly comprising an inflator, a coupling device, an airbag, a cover, and a reaction device;
   said inflator being positioned to supply inflation fluid to said airbag;
   said reaction device including a rear wall having an inflator-accommodating portion which receives a front portion of said inflator;
   said cover being formed in one piece;

said coupling device, said airbag, and said cover being coupled to said reaction device with a set of fastening elements;

each of said fastening elements extending through said airbag, said cover and said rear wall of said reaction device;

said coupling device including a rear wall having an inflator-accommodating portion, which receives said front portion of said inflator, and a planar coupling surface, which surrounds said inflator-accommodating portion;

said rear wall of said reaction device including a planar coupling surface which surrounds its inflator-accommodating portion;

said fastening elements being joined to said coupling surface of said coupling device;

said fastening elements extending through said coupling surface of said reaction device;

said coupling surface of said coupling device and said coupling surface of said reaction device being disposed in planes parallel to each other; and said inflator-accommodating portion of said coupling device comprising a curved impression which conforms to the outer contour of a central section of said front portion of said inflator and which includes a series of openings aligned with said primary discharge orifices.

16. An airbag assembly comprising an inflator, a coupling device, an airbag, a cover, and a reaction device;

said inflator being positioned to supply inflation fluid to said airbag;

said reaction device including a rear wall having an inflator-accommodating portion which receives a front portion of said inflator;

said cover being formed in one piece;

said coupling device, said airbag, and said cover being coupled to said reaction device with a set of fastening elements;

each of said fastening elements extending through said airbag, said cover and said rear wall of said reaction device;

said coupling device including a rear wall having an inflator-accommodating portion, which receives said front portion of said inflator, and a planar coupling surface, which surrounds said inflator-accommodating portion;

said rear wall of said reaction device including a planar coupling surface which surrounds its inflator-accommodating portion;

said fastening elements being joined to said coupling surface of said coupling device;

said fastening elements extending through said coupling surface of said reaction device;

said coupling surface of said coupling device and said coupling surface of said reaction device being disposed in planes parallel to each other;

said airbag comprising a bag which is formed from a flexible fabric and which has a mouth portion defining a fluid inlet opening;

said mouth portion including coupling openings sized and arranged to receive portions of said fastening elements;

said cover comprising a coupling flange including coupling openings which receive said portions of said fastening elements;

said mouth portion and said cover coupling flange being sandwiched between said rear wall of said coupling device and said rear wall of said reaction device; and said coupling device being enclosed with a hem formed in said mouth portion of said bag and said hem including said coupling openings of said airbag.

17. An airbag assembly comprising an inflator, a coupling device, an airbag, a cover, and a reaction device;

said inflator being positioned to supply inflation fluid to said airbag;

said reaction device including a rear wall having an inflator-accommodating portion which receives a front portion of said inflator;

said cover being formed in one piece;

said coupling device, said airbag, and said cover being coupled to said reaction device with a set of fastening elements; and each of said fastening elements extending through said airbag, said cover and said rear wall of said reaction device said coupling device including a rear wall having an inflator-accommodating portion, which receives said front portion of said inflator, and a planar coupling surface, which surrounds said inflator-accommodating portion;

said rear wall of said reaction device including a planar coupling surface which surrounds its inflator-accommodating portion;

said fastening elements being joined to said coupling surface of said coupling device;

said fastening elements extending through said coupling surface of said reaction device; and said coupling surface of said coupling device and said coupling surface of said reaction device being disposed in planes parallel to each other;

said airbag comprising a bag which is formed from a flexible fabric and which has a mouth portion defining a fluid inlet opening;

said mouth portion including coupling openings sized and arranged to receive portions of said fastening elements;

said cover comprising a coupling flange including coupling openings which receive said portions of said fastening elements;

said mouth portion and said cover coupling flange being sandwiched between said rear wall of said coupling device and said rear wall of said reaction device;

said airbag assembly further comprising a heat shield which cradles a rear portion of said inflator;

said heat shield being integrally joined to said reaction device; and said airbag assembly further comprising a deflecting device which deflects inflation fluid away from said airbag mouth portion and said cover coupling flange and which directs the inflation fluid toward said airbag fluid inlet during deployment of said airbag assembly.

18. An airbag assembly as set forth in claim 17 wherein said deflecting device is positioned between said coupling surface of said reaction device and said coupling surface of said coupling device.

19. An airbag assembly comprising an inflator, a coupling device, an airbag, a cover, and a reaction device;

said inflator being positioned to supply inflation fluid to said airbag;

said reaction device including a rear wall having an inflator-accommodating, portion which receives a front portion of said inflator;

said coupling device, said airbag, and said cover being coupled to said reaction device with a set of fastening elements;

each of said fastening elements extending through said airbag, said cover and said rear wall of said reaction device;

said coupling device including a rear wall having an inflator-accommodating portion, which receives said front portion of said inflator, and a planar coupling surface, which surrounds said inflator-accommodating portion;

said rear wall of said reaction device including a planar coupling surface which surrounds its inflator-accommodating portion;

said fastening elements being joined to said coupling surface of said coupling device;

said fastening elements extending through said coupling surface of said reaction device;

said coupling surface of said coupling device and said coupling surface of said reaction device are disposed in planes parallel to each other; and said inflator-accommodating portion of said coupling device comprising a curved impression which conforms to the outer contour of a central section of said front portion of said inflator and which includes a series of openings aligned with said primary discharge orifices.

20. An airbag assembly comprising an inflator, a coupling device, an airbag, a cover, and a reaction device;

said inflator being positioned to supply inflation fluid to said airbag;

said reaction device including a rear wall having an inflator-accommodating portion which receives a front portion of said inflator;

said coupling device, said airbag, and said cover being coupled to said reaction device with a set of fastening elements;

each of said fastening elements extending through said airbag, said cover and said rear wall of said reaction device said coupling device including a rear wall having an inflator-accommodating portion, which receives said front portion of said inflator, and a planar coupling surface, which surrounds said inflator-accommodating portion;

said rear wall of said reaction device including a planar coupling surface which surrounds its inflator-accommodating portion;

said fastening elements being joined to said coupling surface of said coupling device;

said fastening elements extending through said coupling surface of said reaction device;

said coupling surface of said coupling device and said coupling surface of said reaction device being disposed in planes parallel to each other;

said airbag comprising a bag which is formed from a flexible fabric and which has a mouth portion defining a fluid inlet opening;

said mouth portion including coupling openings sized and arranged to receive portions of said fastening elements;

said cover comprising a coupling flange including coupling openings which receive said portions of said fastening elements;

said mouth portion and said cover coupling flange being sandwiched between said rear wall of said coupling device and said rear wall of said reaction device;

said reaction device further comprising top and bottom walls and side walls;

said top and bottom walls of said reaction device extending perpendicularly to and frontward from top and bottom edges of said rear wall of said reaction device;

said side walls of said reaction device extending perpendicularly to and frontward from side edges of said rear wall and joining, at top and bottom edges, with said top and bottom walls of said reaction device;

said coupling device further comprising a top wall, a bottom wall, and side walls;

said top and bottom walls of said coupling device extending perpendicularly to and frontward from top and bottom edges of said rear wall of said coupling device;

said side walls of said coupling device extending perpendicularly to and frontward from side edges of said rear wall of said coupling device and joining, at top and bottom edges with said top and bottom walls of said coupling device;

said cover comprising a front wall, side walls, and top and bottom walls;

said top and bottom walls of said cover extending rearwardly from top and bottom edges of said front wall and said side walls of said cover extending rearwardly from side edges of said front wall;

said coupling device being positioned within a cavity formed by said walls of said reaction device; and portions of said airbag and said cover being sandwiched between said top and bottom walls of said coupling device and said top and bottom walls of said reaction device.

21. An airbag assembly as set forth in claim 20 wherein said top and bottom edges of said side walls of said cover are joined with said top and bottom walls of said cover, and wherein front edges of said side walls of said cover are unjoined with said front wall of said cover.

22. An airbag assembly as set forth in claim 21 wherein:

said top and bottom walls of said cover each include a proximate portion, a distal portion, and a coupling flange portion;

said proximate portions taper inwardly from the top and bottom edges of said front wall;

said distal portions extend from said proximate portions and are generally parallel to each other;

said coupling flange of said cover extending perpendicularly inwardly from free ends of said distal portions;

said proximate portion of said bottom wall includes a designed weakness so that, during deployment of said airbag assembly, said front wall will pivot upwardly;

said distal portions are sandwiched between said top and bottom walls of said coupling device and said top and bottom walls of said reaction device; and said coupling flange portions collectively form said coupling flange of said cover and each include some of said coupling openings of said cover.

23. An airbag assembly as set forth in claim 22 wherein said coupling openings of one of said coupling flange portions comprise closed circular openings through which said shaft portions are inserted and said coupling openings of the other of said coupling flange portions comprise unclosed openings about which said shaft portions are snapped.

24. An airbag assembly as set forth in claim 20 wherein:
said top and bottom walls of said coupling device include ribs;
said top and bottom walls of said reaction device include ribs shaped and arranged similarly to said ribs of said coupling device;
said top and bottom walls of said cover include depressions shaped and arranged similarly to said ribs of said coupling device and said reaction device;
said depressions of said cover are sandwiched between said ribs of said coupling device and said ribs of said reaction device; and
said ribs of said coupling device and said ribs of said reaction device cooperate to protect against fishmouthing of said reaction device during deployment of said airbag assembly.

25. An airbag assembly as set forth in claim 24 wherein said ribs of said coupling device, said ribs of said reaction device, and said depressions of said cover are finger-shaped.

26. An air bag assembly as set forth in claim 20 wherein said coupling device consists essentially of a monolithic structure.

27. An airbag assembly as set forth in claim 20 wherein:
said airbag assembly further comprises a heat shield which cradles a rear portion of said inflator;
said heat shield includes a planar coupling surface which is disposed in a plane parallel to said coupling surfaces of said coupling device and said reaction device; and
said fastening elements extend through said coupling surface of said heat shield thereby coupling said heat shield to said reaction device.

28. An airbag assembly comprising an inflator, a heat shield, a coupling device, an airbag, a cover and a reaction device;
said inflator being coupled to said heat shield and positioned to supply inflation fluid to said airbag;
said heat shield, said coupling device, said airbag, and said cover being coupled to said reaction device with a set of fasteners;
each of said fasteners extending through said heat shield, said airbag, said cover, and said reaction device.

29. An airbag assembly as set forth in claim 28 wherein:
said inflator includes a cylindrical housing having a radial dimension and an axial dimension substantially greater than said radial dimension;
said inflator further includes coupling members which are attached to said housing;
said housing encloses a fluid source and includes a front portion and a rear portion;
said front portion of said housing includes primary discharge orifices which release inflation fluid to said airbag during deployment of said airbag assembly.

30. An airbag assembly as set forth in claim 29 wherein:
said cover includes alignment projections;
said reaction device includes alignment openings which receive said projections; and
said heat shield includes dimples which receive said alignment projections.

31. An airbag assembly as set forth in claim 30 wherein:
said reaction device comprises a rear wall having an inflator-accommodating portion which receives said front portion of said inflator housing and a planar coupling surface which surrounds said inflator-accommodating portion;
said planar coupling surface includes said alignment openings;
said cover comprises a front wall, a top wall and a bottom wall, said top and bottom walls extending inwardly from said front wall;
said top and bottom walls include coupling flanges which are sandwiched between said rear wall of said reaction device and said coupling device;
said alignment projections extend rearwardly from said coupling flanges of said cover; and
said heat shield includes a main wall which cradles said rear portion of said inflator housing and which includes said dimples.

32. An airbag assembly as set forth in claim 29 wherein:
said heat shield includes a main wall, a side wall, and a coupling flange;
said main wall cradles said rear portion of said inflator housing; and
said side wall cooperates with said coupling members of said inflator to couple said inflator and said heat shield together.

33. An airbag assembly as set forth in claim 32 wherein:
said rear portion of said inflator housing defines secondary discharge orifices which vent inflation fluid from said housing during deployment of said airbag assembly; and
said main wall additionally includes a row of openings which are located on a rear region of said wall and which align with said secondary discharge orifices of said inflator.

34. An airbag assembly as set forth in claim 32 wherein said heat shield further includes a coupling flange which includes a coupling surface for said heat shield and which includes coupling openings to receive said primary fastening elements.

35. An airbag assembly as set forth in claim 34 wherein said heat shield consists essentially of a monolithic structure.

36. An airbag assembly as set forth in claim 34 wherein front edges of said main wall integrally join with said coupling surface of said reaction device.

37. An airbag assembly as set forth in claim 34 wherein:
said main wall is generally parabolic in cross-sectional shape and is sized to generously surround said rear portion of said inflator housing;
said main wall includes indentations which cause a deviation from said parabolic shape and which clasp regions of said rear portion of said inflator housing, said regions being located away from said secondary discharge orifices;
said side wall closes one side end of said main wall and thus is parabolic in shape;

said coupling flange extends from front edges of said main wall and a front edge of said side wall to form a three-sided frame;

said coupling flange includes coupling portions which extend substantially perpendicularly from said indentations;

said coupling portions are positioned in substantially the same plane and collectively form said coupling surface of said heat shield; and each coupling portion includes an opening which receives a primary fastening element.

38. A method of assembling an airbag assembly comprising the steps of:

providing an inflator, a heat shield, a coupling device, an airbag, a cover, and a reaction device;

coupling the inflator to the heat shield to form an inflator/shield subassembly;

coupling the coupling device, the airbag, and the cover together to form an airbag/cover subassembly;

coupling the airbag/cover subassembly to the reaction device to form a reaction/airbag/cover subassembly; and coupling the inflator/shield subassembly to the reaction/airbag/cover subassembly to complete the airbag assembly.

39. A method as set forth in claim 38 further comprising the step of providing a set of primary fastening elements and wherein said coupling steps include the steps of using the primary fastening elements to:

couple the coupling device, the airbag, and the cover together to form the airbag/cover subassembly;

couple the reaction device to the airbag/cover subassembly to form the reaction/airbag/cover subassembly; and couple the inflator/shield subassembly to the reaction/airbag/cover subassembly to complete the airbag assembly.

40. A method as set forth in claim 39 wherein:

said step of providing a set of primary fastening elements comprises the step of providing fastening elements which each include a shaft portion and a locking portion which mates with the shaft portion to lock said fastening element in a desired position; and said coupling steps include the step of mating a locking portion to a section of a shaft portion exterior to the airbag assembly whereby the locking portions are visible from the exterior of said airbag assembly.

41. A method of assembling an airbag assembly comprising the steps of:

providing an inflator, a heat shield, a coupling device, an airbag, a cover, and a reaction device;

coupling the inflator to the heat shield to form an inflator/shield subassembly;

coupling the coupling device, the airbag, and the cover together to form an airbag/cover subassembly;

coupling the airbag/cover subassembly to the reaction device to form a reaction/airbag/cover subassembly; and coupling the inflator/shield subassembly to the reaction/airbag/cover subassembly to complete the airbag assembly;

wherein said step of coupling the inflator/shield subassembly to the reaction/airbag/cover subassembly is performed at a different location than said step of forming the airbag/cover subassembly.

42. A method of assembling an airbag assembly comprising the steps of:

providing an inflator, a heat shield, a coupling device, an airbag, a cover, and a reaction device;

coupling the inflator to the heat shield to form an inflator/shield subassembly;

coupling the coupling device, the airbag, and the cover together to form an airbag/cover subassembly;

coupling the airbag/cover subassembly to the reaction device to form a reaction/airbag/cover subassembly; and coupling the inflator/shield subassembly to the reaction/airbag/cover subassembly to complete the airbag assembly;

wherein said step of coupling the coupling device, the airbag, and the cover together comprises positioning the airbag mouth portion around the coupling device.

43. A method of assembling an airbag assembly comprising the steps of:

providing an inflator, a heat shield, a coupling device, an airbag, a cover, and a reaction device;

coupling the inflator to the heat shield to form an inflator/shield subassembly;

coupling the coupling device, the airbag, and the cover together to form an airbag/cover subassembly;

coupling the airbag/cover subassembly to the reaction device to form a reaction/airbag/cover subassembly; and coupling the inflator/shield subassembly to the reaction/airbag/cover subassembly to complete the airbag assembly;

wherein said step of coupling the coupling device, the airbag, and the cover together comprises enclosing said coupling device with a hem formed in the mouth portion of the bag.

44. A method of assembling an airbag assembly comprising the steps of:

providing an inflator, a heat shield, a coupling device, an airbag, a cover, and a reaction device;

coupling the heat shield and the reaction device together to form a combined heat shield/reaction device;

coupling the inflator to the combined heat shield/reaction device to form a reaction/inflator/shield subassembly;

coupling the coupling device, the airbag, and the cover together to form an airbag/cover subassembly; and coupling the reaction/inflator/shield subassembly and the airbag/cover subassembly together to complete the airbag assembly.

45. A method as set forth in claim 44 further comprising the step of providing a set of primary fastening elements and wherein said coupling steps include the steps of using the primary fastening elements to:

couple the coupling device, the airbag, and the cover together to form the airbag/cover subassembly; and couple the airbag/cover subassembly, and the reaction/inflator/shield subassembly together to complete the airbag assembly.

46. A method as set forth in claim 45 wherein said step of forming the combined heat shield/reaction device comprises the step of integrally forming the heat shield and the reaction device together.

47. An airbag-assembly comprising an inflator/shield subassembly, a coupling device, an airbag, a cover, and a reaction device;

said inflator/shield subassembly being positioned to supply inflation fluid to said airbag;

said reaction device including a rear wall having an inflator-accommodating portion which receives a front portion of an inflator housing;

said coupling device, said airbag, said inflator/shield subassembly and said cover being coupled to said reaction device with a set of fastening elements;

each of said fastening elements extending through said airbag, said cover, said inflator/shield subassembly and said rear wall of said reaction device;

said inflator-accommodating portion of said reaction device comprising a curved impression which conforms to the outer contour of said front portion of said inflator housing.

48. An airbag assembly as set forth in claim 41 wherein:

said coupling device includes a rear wall having an inflator-accommodating portion, which receives said front portion of said inflator/shield subassembly, and a planar coupling surface, which surrounds said inflator-accommodating portion;

said rear wall of said reaction device includes a planar coupling surface which surrounds its inflator-accommodating portion;

said fastening elements are joined to said coupling surface of said coupling device;

said fastening elements extend through said coupling surface of said reaction device; and said coupling surface of said coupling device and said coupling surface of said reaction device are disposed in planes parallel to each other.

49. An airbag assembly as set forth in claim 47 wherein:

said airbag comprises a bag which is formed from a flexible fabric and which has a mouth portion defining a fluid inlet opening;

said mouth portion includes coupling openings sized and arranged to receive portions of said fastening elements;

said cover comprises a coupling flange including coupling openings which receive said portions of said fastening elements; and said mouth portion and said cover coupling flange are sandwiched between said rear wall of said coupling device and said rear wall of said reaction device.

50. An airbag assembly as set forth in claim 47 wherein portions of said cover are sandwiched between said reaction device and said coupling device.

* * * * *